(12) United States Patent
Hyodo et al.

(10) Patent No.: US 11,274,745 B2
(45) Date of Patent: Mar. 15, 2022

(54) WHEEL LOADER

(71) Applicant: Hitachi Construction Machinery Co., Ltd., Tokyo (JP)

(72) Inventors: Koji Hyodo, Kasumigaura (JP); Masashi Yamashita, Ushiku (JP); Tetsuji Tanaka, Abiko (JP); Katsutaka Hara, Toride (JP); Masaki Nukii, Ushiku (JP); Isamu Aoki, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 501 days.

(21) Appl. No.: 15/756,072

(22) PCT Filed: Dec. 14, 2016

(86) PCT No.: PCT/JP2016/087189
§ 371 (c)(1),
(2) Date: Feb. 28, 2018

(87) PCT Pub. No.: WO2017/110612
PCT Pub. Date: Jun. 29, 2017

(65) Prior Publication Data
US 2018/0252314 A1 Sep. 6, 2018

(30) Foreign Application Priority Data

Dec. 25, 2015 (JP) .................................. 2015-255267

(51) Int. Cl.
*F01P 11/10* (2006.01)
*F16H 61/18* (2006.01)
(Continued)

(52) U.S. Cl.
CPC ............ *F16H 61/18* (2013.01); *B60K 11/085* (2013.01); *B60W 30/1843* (2013.01);
(Continued)

(58) Field of Classification Search
CPC .............. F16H 61/18; F16H 2061/166; B60W 30/1843; F01P 11/10; F01P 5/02; F01P 2025/66
(Continued)

(56) References Cited

U.S. PATENT DOCUMENTS 3,490,686 A * 1/1970 Weir ........................ F01P 7/042
416/32
6,070,560 A * 6/2000 Johnston ................... F01P 5/02
123/41.11
(Continued)

FOREIGN PATENT DOCUMENTS

EP 1081353 A1 * 3/2001 ......... F02D 41/0007
GB 2520077 A 5/2015
(Continued)

OTHER PUBLICATIONS

International Search Report of PCT/JP2016/087189 dated Mar. 7, 2017.

*Primary Examiner* — Logan M Kraft
*Assistant Examiner* — Joshua Campbell
(74) *Attorney, Agent, or Firm* — Mattingly & Malur, PC

(57) ABSTRACT

To curb temperature rises in a control device for a supercharger and extend the life of the control device for the supercharger, a work vehicle includes a variable geometry supercharger with variable boost pressure, and a working device driven by pressure oil discharged from a working hydraulic pump, the work vehicle further including: a supercharger control device adapted to control the supercharger; a temperature detection device adapted to detect temperature of the supercharger control device; and a main control device adapted to limit at least one of maximum rotational speed of an engine and maximum vehicle speed of the work vehicle in case the temperature of the supercharger control device is above a predetermined temperature as compared to (Continued)

case the temperature of the supercharger control device is below the predetermined temperature.

6 Claims, 14 Drawing Sheets

(51) Int. Cl.
| | |
|---|---|
| *F02B 39/16* | (2006.01) |
| *F16H 59/78* | (2006.01) |
| *F02D 29/02* | (2006.01) |
| *F16H 63/50* | (2006.01) |
| *F01P 7/04* | (2006.01) |
| *F02B 37/24* | (2006.01) |
| *B60W 30/184* | (2012.01) |
| *B60K 11/08* | (2006.01) |
| *F02D 41/00* | (2006.01) |
| *F01P 7/16* | (2006.01) |
| *B60W 50/12* | (2012.01) |
| *F01P 5/04* | (2006.01) |
| *F02D 45/00* | (2006.01) |
| *F02D 29/04* | (2006.01) |
| *F16H 61/16* | (2006.01) |
| *F02D 31/00* | (2006.01) |
| *F01P 5/02* | (2006.01) |

(52) U.S. Cl.
CPC ............. *B60W 50/12* (2013.01); *F01P 5/04* (2013.01); *F01P 7/044* (2013.01); *F01P 7/16* (2013.01); *F01P 11/10* (2013.01); *F02B 37/24* (2013.01); *F02B 39/16* (2013.01); *F02D 29/02* (2013.01); *F02D 41/0007* (2013.01); *F02D 45/00* (2013.01); *F16H 59/78* (2013.01); *F16H 63/50* (2013.01); *B60W 2510/0633* (2013.01); *B60W 2510/0676* (2013.01); *B60W 2520/10* (2013.01); *B60W 2710/0644* (2013.01); *B60W 2720/10* (2013.01); *B60Y 2200/41* (2013.01); *B60Y 2400/435* (2013.01); *F01P 5/02* (2013.01); *F01P 2025/66* (2013.01); *F01P 2060/02* (2013.01); *F01P 2060/14* (2013.01); *F01P 2060/16* (2013.01); *F02B 2039/164* (2013.01); *F02D 29/04* (2013.01); *F02D 31/006* (2013.01); *F02D 2200/021* (2013.01); *F16H 2061/166* (2013.01); *F16H 2061/185* (2013.01); *Y02T 10/12* (2013.01)

(58) Field of Classification Search
USPC .......................................... 123/41.48, 41.49
See application file for complete search history.

(56) References Cited

U.S. PATENT DOCUMENTS

| | | | | |
|---|---|---|---|---|
| 7,415,945 | B2* | 8/2008 | Tuttle | F01P 7/042 |
| | | | | 123/41.11 |
| 8,714,116 | B2* | 5/2014 | Hartman | F01P 7/042 |
| | | | | 123/41.49 |
| 8,868,306 | B1* | 10/2014 | Shiina | E02F 9/2253 |
| | | | | 701/54 |
| 2001/0015181 | A1* | 8/2001 | Purcell | G05D 23/1917 |
| | | | | 123/41.31 |
| 2002/0066422 | A1* | 6/2002 | Hawkins | F01P 7/044 |
| | | | | 123/41.12 |
| 2009/0217655 | A1* | 9/2009 | Yabuki | F01P 7/044 |
| | | | | 60/456 |
| 2013/0284419 | A1* | 10/2013 | Collins | A01D 41/12 |
| | | | | 165/287 |
| 2014/0058607 | A1* | 2/2014 | Magaki | F02D 11/107 |
| | | | | 701/22 |

FOREIGN PATENT DOCUMENTS

| | | | | |
|---|---|---|---|---|
| JP | 62-114152 | U | | 7/1987 |
| JP | 02082064 | A | * | 11/1990 |
| JP | 08177700 | A | * | 7/1996 |
| JP | 09-228860 | A | | 9/1997 |
| JP | 2011-001896 | A | | 1/2011 |
| JP | 2013-213416 | A | | 10/2013 |
| JP | 2015-140767 | A | | 8/2015 |
| WO | WO-2014175182 | A1 | * | 10/2014 ............ B60W 10/04 |
| WO | WO-2014199722 | A1 | * | 12/2014 ............ B60K 6/485 |
| WO | 2015/037503 | A1 | | 3/2015 |

* cited by examiner

WHEEL LOADER

TECHNICAL FIELD

The present invention relates to a work vehicle.

BACKGROUND ART

An engine control device for a work vehicle is known, where the engine control device limits maximum rotational speed of a prime mover to a lower level in case a cooling oil temperature is above a predetermined temperature than case the cooling oil temperature is below the predetermined temperature, in order to curb rises in brake cooling oil temperature caused when a brake is operated at high vehicle speed (see Patent Literature 1).

CITATION LIST

Patent Literature

Patent Literature 1: Japanese Patent Laid-Open No. 2015-140767

SUMMARY OF INVENTION

Technical Problem

Now, to meet emission controls, consideration is being given to equipping a work vehicle with a variable geometry turbo (VGT) capable of efficient supercharging even at low revs at which exhaust energy from an engine is low. Recently, however, with increasing engine downsizing, increasingly high loads have come to act on superchargers. Consequently, there are concerns about the influence of heat on control devices adapted to control the superchargers. If the control device for a supercharger becomes hot, the control device might break down. Patent Literature 1 does not disclose any supercharger or any control device adapted to control a supercharger or does not make any mention of the influence of heat on a control device.

Solution to Problem

A work vehicle according to one aspect of the present invention comprises a variable geometry supercharger with variable boost pressure, and a working device driven by pressure oil discharged from a working hydraulic pump, the work vehicle further comprising: a supercharger control device adapted to control the supercharger; a temperature detection device adapted to detect temperature of the supercharger control device; and a main control device adapted to limit at least one of maximum rotational speed of an engine and maximum vehicle speed of the work vehicle in case the temperature of the supercharger control device is above a predetermined temperature as compared to case the temperature of the supercharger control device is below the predetermined temperature.

Advantageous Effects of Invention

According to the present invention, temperature rises in the control device for the supercharger are curbed and the life of the control device for the supercharger can be extended.

DESCRIPTION OF EMBODIMENTS

An embodiment of a work vehicle according to the present invention will be described below with reference to the drawings.

First Embodiment

Figure 1:
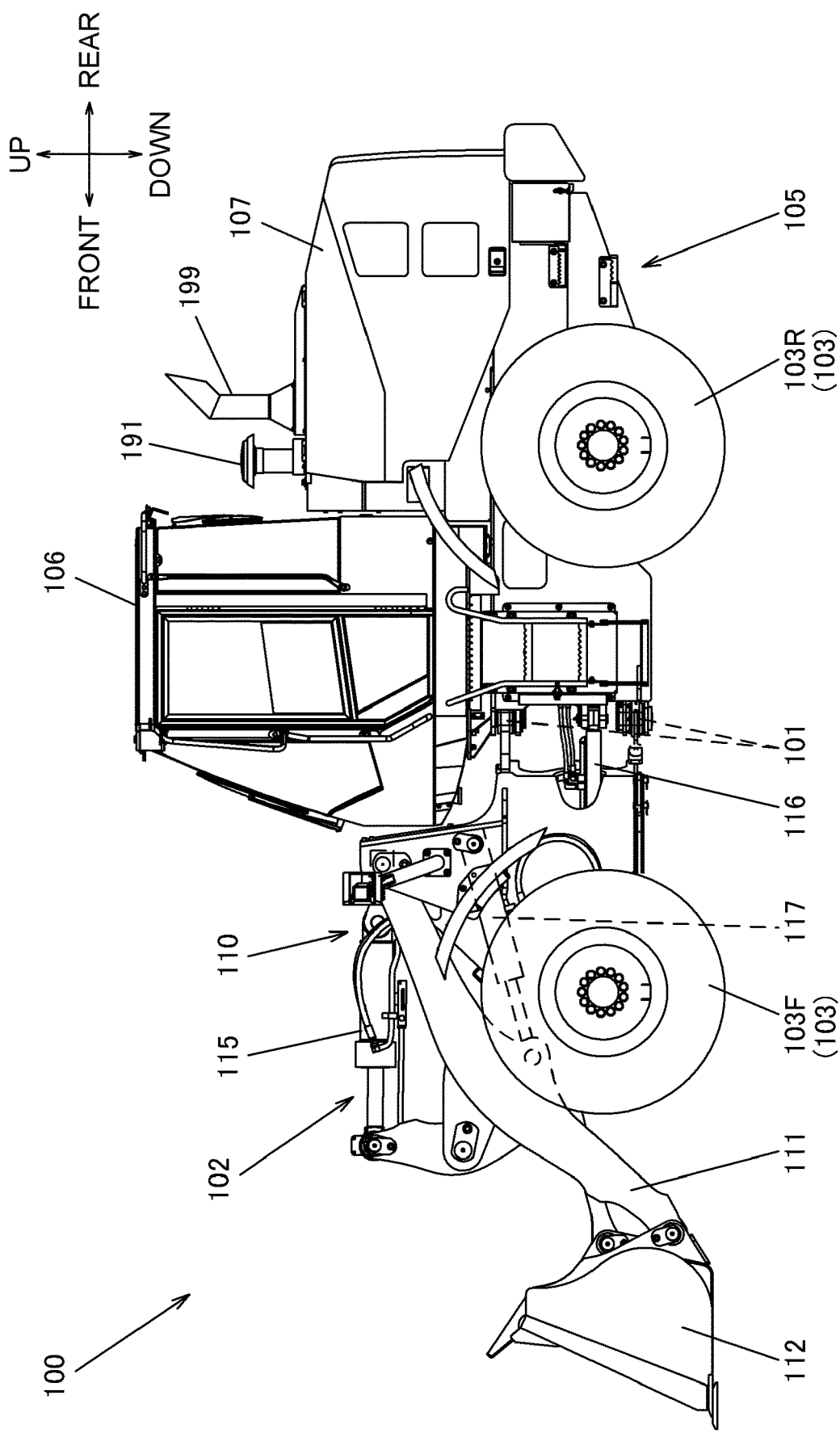
FIG. 1 is a side view of a wheel loader.

FIG. 1 is a side view of a wheel loader 100 which is an example of a work vehicle according to a first embodiment of the present invention. The wheel loader 100 is made up of a front vehicle body 110 which includes an arm 111, a bucket 112, and front wheels 103F; and a rear vehicle body 105 which includes a cab 106, a machine room 107, and rear wheels 103R. An engine is disposed in the machine room 107.

The arm 111 swings in an up-and-down direction (elevating motion) by being driven by an arm cylinder 117 and the bucket 112 swings in the up-and-down direction (crowd or dump) by being driven by a bucket cylinder 115. The arm 111, arm cylinder 117, bucket 112, and bucket cylinder 115 make up a front working device 102. The front vehicle body 110 and rear vehicle body 105 are pivotally coupled together by a center pin 101 and the front vehicle body 110 bends left and right with respect to the rear vehicle body 105 as a steering cylinder 116 extends and retract.

Figure 2:
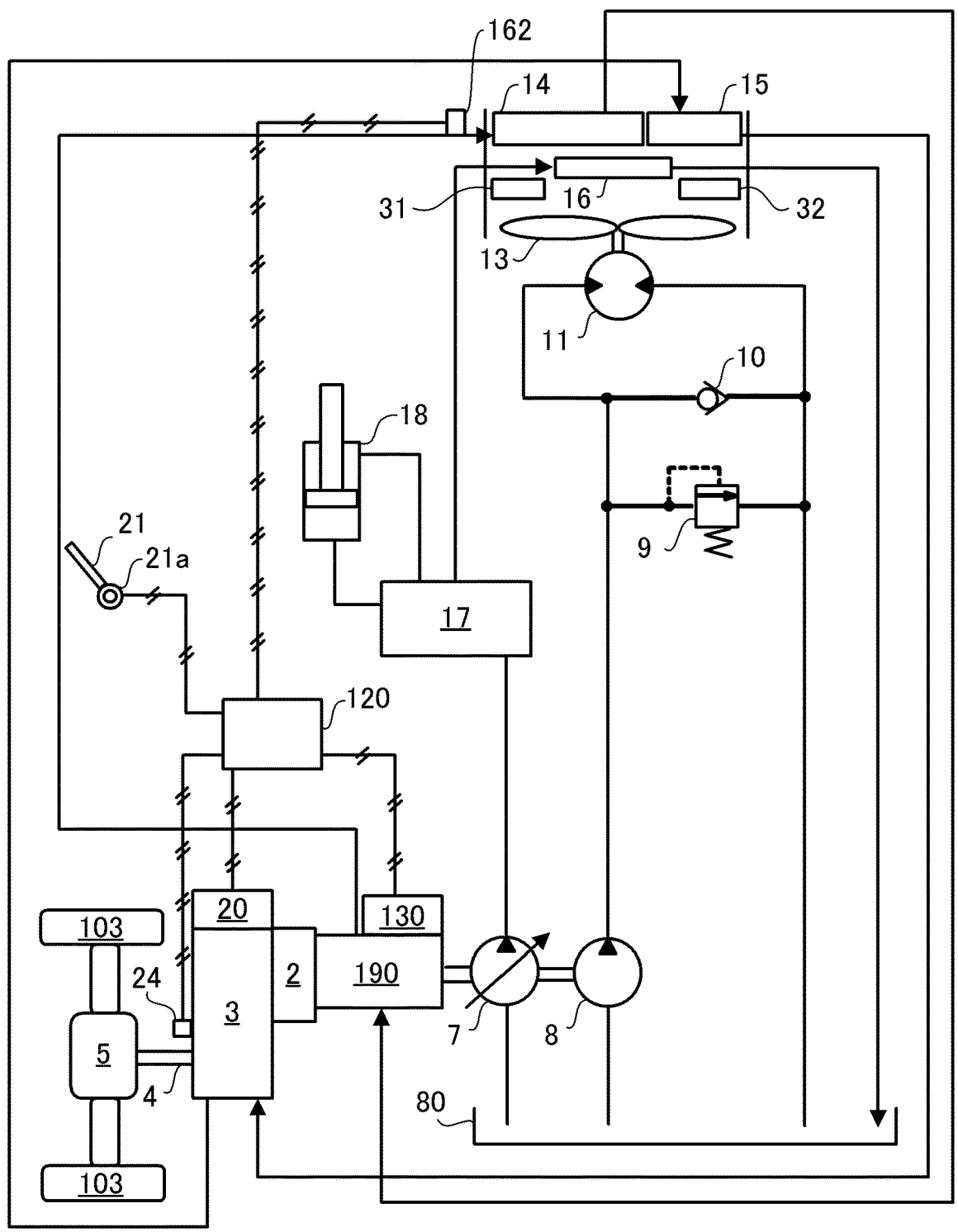
FIG. 2 is a diagram showing a schematic configuration of the wheel loader.

FIG. 2 is a diagram showing a schematic configuration of the wheel loader 100. The wheel loader 100 is equipped with running gear (running system) adapted to transmit rotation of an engine 190 to tires 103 via a torque converter 2, transmission 3, propeller shaft 4, and axle 5. An output shaft of the engine 190 is coupled with an input shaft of the torque converter 2, and an output shaft of the torque converter 2 is coupled to the transmission 3. The torque converter 2 is a fluid clutch made up of a well-known impeller, turbine, and stator and the rotation of the engine 190 is transmitted to the transmission 3 via the torque converter 2. The transmission 3 includes a clutch adapted to switch the speed stage of the transmission 3 among a first stage to fourth stage, and rotation of the output shaft of the torque converter 2 is changed in speed by the transmission 3. The rotation after the speed change is transmitted to the tires 103 via the propeller shaft 4, axle 5, and the like, causing the wheel loader 100 to run.

The torque converter 2 has a function to increase output torque compared to input torque, i.e., a function to make a torque ratio equal to or larger than 1. The torque ratio decreases with increases in a torque converter velocity ratio (=output rotational speed/input rotational speed), which is a ratio of rotational speed of the output shaft to rotational speed of the input shaft of the torque converter 2. For example, if a running load increases during driving while engine rotational speed is constant, the rotational speed of the output shaft of the torque converter 2 decreases, i.e., the vehicle speed decreases, decreasing the torque converter velocity ratio. In so doing, the torque ratio increases, making it possible to run with a larger travel driving force (traction).

The transmission 3 is an automatic gearbox having solenoid valves corresponding to respective speed stages, i.e., the first stage to fourth stage. The solenoid valves are driven by a control signal outputted from the main controller 120 to a transmission control device 20, and the transmission 3 shifts gears according to the control signal.

An accelerator pedal 21 is disposed in the cab 106 of the wheel loader 100. The rotational speed of the engine 190 increases with increases in an amount of operation (amount of depression) of the accelerator pedal 21. As the rotational speed of the engine increases, rotational speed of an aftermentioned hydraulic pump for driving a working device (hereinafter referred to as a working pump 7) and an after-mentioned hydraulic pump for driving a cooling fan (hereinafter referred to as a fan pump 8) increase, increasing flow rates of hydraulic oil discharged from the hydraulic pumps.

The wheel loader 100 further includes the working pump 7 driven by the engine 190, a control valve 17 adapted to control pressure oil discharged from the working pump 7, and working hydraulic cylinders 18 (e.g., the bucket cylinder 115 and arm cylinder 117). The control valve 17 is driven by operation of a non-illustrated control lever, and the working hydraulic cylinder 18 is driven according to an amount of operation of the control lever. That is, the front working device 102 is driven by the pressure oil discharged from the working pump 7.

The wheel loader 100 further includes the fan pump 8 driven by the engine 190, a hydraulic motor for a fan (hereinafter referred to as a fan motor 11), the hydraulic motor being driven by the pressure oil discharged from the fan pump 8, a cooling fan 13 rotated by the fan motor 11, a relief valve 9 which defines maximum pressure of the fan pump 8, and a check valve 10 for use to prevent cavitation in case a hydraulic circuit adapted to drive the fan motor 11 develops negative pressure due to a change in the rotational speed of the engine 190. The fan motor 11 rotates the cooling fan 13 adapted to send outside air (cooling air) to a heat exchanger unit having plural heat exchangers. Maximum rotational speed of the fan motor 11 depends on set pressure of the relief valve 9. The heat exchanger unit includes a radiator 14, a hydraulic oil cooler 16, a working fluid cooler 15, an intercooler 31, and an EGR cooler 32 as heat exchangers.

Cooling water of the engine 190 flows into the radiator 14 via a thermostat (not illustrated), is cooled by the radiator 14, and then returns to the engine 190 again. Note that the cooling water of the engine 190 is also led to a casing of a control board making up a turbo controller 140 described later and cools the turbo controller 140 by passing through a cooling water passage provided in the casing. The hydraulic oil is pumped up and discharged from a tank 80 by the working pump 7, flows into the hydraulic oil cooler 16 via the control valve 17, is cooled by the hydraulic oil cooler 16, and then returns to the tank 80 again. The working fluid in the torque converter 2 flows from the torque converter 2 into the working fluid cooler 15, is cooled in the working fluid cooler 15, and then returns to the torque converter 2 again.

In case the pressure oil (hydraulic oil) discharged from the fan pump 8 is supplied to the fan motor 11, the fan motor 11 rotates, causing the cooling fan 13 coupled to a rotating shaft of the fan motor 11 to rotates. The oil supplied to the fan motor 11 returns to the tank 80. In case the cooling fan 13 rotates, cooling air is generated by the cooling fan 13. The cooling air generated by the cooling fan 13 is sent to the radiator 14, hydraulic oil cooler 16, working fluid cooler 15, intercooler 31, and EGR cooler 32, cooling the cooling water of the engine 190, the hydraulic oil, the working fluid, air supercharged by a supercharger 50 described later, and EGR gas through heat exchange with the cooling air.

Being interposed between a discharge-side line of the fan pump 8 and a return-side line to the tank 80, the relief valve 9 limits discharge-side pressure (hereinafter referred to as discharge pressure Pp) of the fan pump 8, which is inlet-side pressure of the fan motor 11 (motor drive pressure). The flow rate of the hydraulic oil discharged from the fan pump 8 depends on the rotational speed of the engine 190. The rotational speed of the cooling fan 13, i.e., the rotational speed of the fan motor 11, depends on the flow rate of the hydraulic oil supplied to the fan motor 11. Therefore, the rotational speed of the cooling fan 13 depends on the rotational speed of the engine 190.

Figure 3:
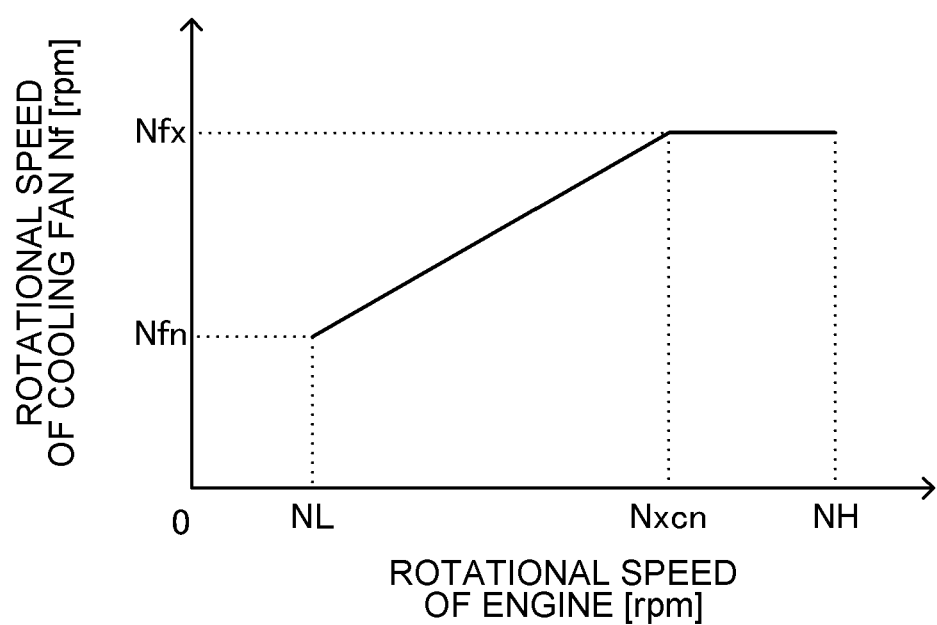
FIG. 3 is a diagram showing a relationship between rotational speed of an engine and rotational speed of a cooling fan.

FIG. 3 is a diagram showing a relationship between the rotational speed of the engine 190 and the rotational speed of the cooling fan 13. In case the rotational speed of the engine 190 is low idling rotational speed NL, the rotational speed Nf of the cooling fan 13 reaches or exceeds minimum rotational speed Nfn. The rotational speed Nf of the cooling fan 13 increases with increases in the rotational speed of the engine 190. In case the rotational speed of the engine 190 becomes equal to or higher than Nxcn, the discharge pressure Pp of the fan pump 8 equals the set pressure of the relief valve 9, and the rotational speed of the cooling fan 13 reaches maximum rotational speed Nfx. Nxcn is a lower limit of an after-mentioned maximum rotational speed Nx of the engine 190. That is, according to the present embodiment, for example, even after a transition from a non-limited state in which the maximum rotational speed Nx of the engine 190 is set at high idling rotational speed NH to a limited state in which the maximum rotational speed Nx of the engine 190 is limited to the lower limit Nxcn, the maximum rotational speed Nfx of the cooling fan 13 can be maintained.

Figure 4A:
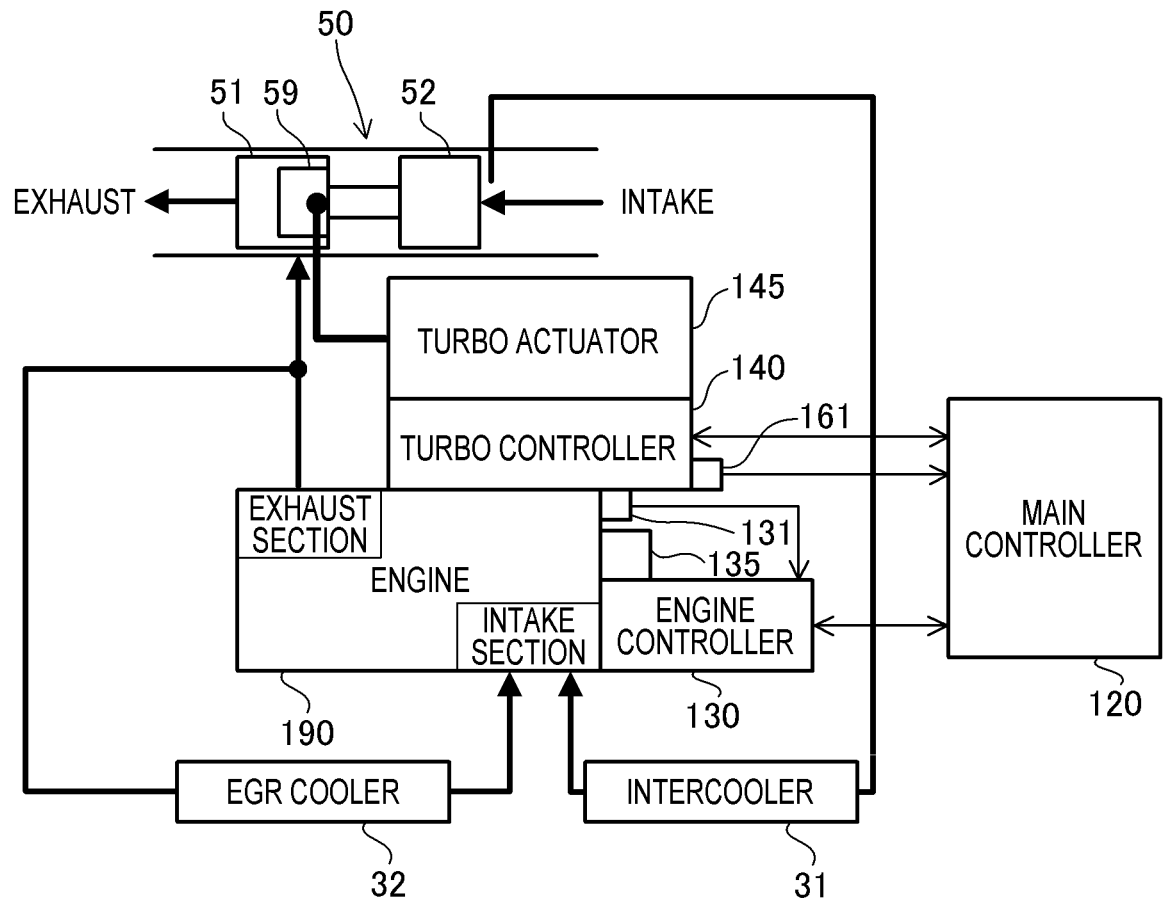
FIG. 4A is a diagram showing a configuration of a control system of the engine.

FIG. 4A is a diagram showing a configuration of a control system of the engine 190. As shown in FIG. 4A, the engine 190 is connected with an exhaust pipe through which exhaust gas discharged from the engine 190 passes, and an intake pipe through which intake air to be supplied to the engine 190 passes. Also, the engine 190 is connected with an EGR pipe branched from an exhaust passage and adapted to lead part of the exhaust gas (hereinafter referred to as EGR gas, where EGR stands for Exhaust Gas Recirculation) to an induction system (on a downstream side of a compressor 52).

An engine system of the wheel loader 100 according to the present embodiment includes the supercharger (turbocharger) 50 for supercharging. The supercharger 50 includes a turbine 51 placed on the exhaust pipe and the compressor 52 placed on the intake pipe. The turbine 51 and compressor 52 are mechanically coupled together. The turbine 51 is equipped with plural turbine blades installed radially on a rotating shaft and is rotationally driven by energy of exhaust gas discharged from an exhaust section of the engine 190. The compressor 52 has plural compressor impellers installed radially on a rotating shaft, and by being rotationally driven by the turbine 51, compresses air sucked from outside and supplies, i.e., supercharges an intake section (engine cylinder) of the engine 190 with the compressed air.

The turbine 51 is equipped with a nozzle vane mechanism 59 as an opening area adjustment mechanism, where the nozzle vane mechanism 59 has plural nozzle vanes capable of changing an area of an inlet used to lead exhaust to the turbine blades. An opening degree of the nozzle vanes is adjusted by a turbo actuator 145. The turbo actuator 145 is driven by a control signal generated by the turbo controller 140 based on an operating state of the engine 190. That is, the supercharger 50 according to the present embodiment is configured as a variable geometry turbocharger capable of changing boost pressure by adjusting the opening degree of the nozzle vanes and thereby changing flow velocity of gas flowing into the turbine 51.

As the opening degree of the nozzle vanes is changed, the rotational speed of the supercharger 50 is adjusted to provide boost pressure and exhaust pressure according to the operating state of the engine 190. By controlling the boost pressure and exhaust pressure of the engine, it is possible to increase an EGR rate and inhibit formation of nitrogen oxides during combustion. During low RPM operation of the engine 190, by reducing the opening degree of the nozzle vanes, the turbo controller 140 can increase the flow velocity of the gas flowing into the turbine blades, thereby increase the rotational speed of the supercharger 50, and thereby improve transient responsiveness of the engine 190.

Air taken in through an intake port 191 (see FIG. 1) is supplied for supercharging to the supercharger 50 via an air cleaner (not illustrated). The supercharging air supplied from the supercharger 50 is sent to the intercooler 31, cooled by the intercooler 31, and supplied to the intake section of the engine 190. After passing through the supercharger 50, the exhaust gas discharged from the exhaust section of the engine 190 is sent to a non-illustrated exhaust device, purified by the exhaust device, subjected to sound volume reduction, and discharged to the atmosphere through a tail pipe 199 (see FIG. 1). Note that the EGR gas is sent to the EGR cooler 32, cooled by the EGR cooler 32, and then supplied (recirculated) to the intake section of the engine 190.

In the engine 190, fuel injection quantity is controlled by a fuel injection device (governor) 135. The fuel injection device is driven by a control signal outputted from an engine controller 130.

Each of the main controller 120, engine controller 130, and turbo controller 140 includes a control board on which an arithmetic processing unit has been mounted, where the arithmetic processing unit is equipped with storage devices such as a CPU, ROM, and RAM, other peripheral circuits, and the like.

As shown in FIGS. 2 and 4A, the main controller 120 is connected with various sensors such as an accelerator operation amount detector 21a (see FIG. 2), vehicle speed sensor 24 (see FIG. 2), substrate temperature sensor 161 (see FIG. 4A), and cooling water temperature sensor 162 (see FIG. 2). Also, the main controller 120 is connected with the engine controller 130 and turbo controller 140, and various information is exchanged among the controllers.

As shown in FIG. 2, the accelerator operation amount detector 21a detects an amount of pedal operation (pedal stroke or pedal angle) of the accelerator pedal 21 and outputs the detected information to the main controller 120. The vehicle speed sensor 24 detects running speed (hereinafter referred to as vehicle speed) of the wheel loader 100 (i.e., the own vehicle) and outputs the detected information to the main controller 120. The cooling water temperature sensor 162 detects temperature of the cooling water (hereinafter referred to as cooling water temperature) of the engine 190 and outputs the detected information to the main controller 120.

As shown in FIG. 4A, the substrate temperature sensor 161, which is mounted on the control board of the turbo controller 140, detects temperature of the control board (hereinafter referred to as substrate temperature Tt) and outputs the detected information to the main controller 120.

Figure 4B:
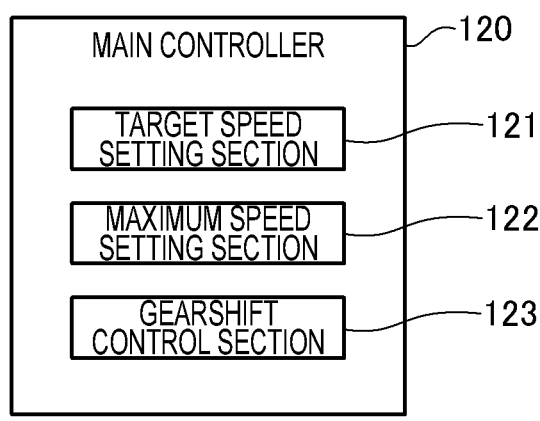
FIG. 4B is a functional block diagram of a main controller.

FIG. 4B is a functional block diagram of the main controller 120. As shown in FIG. 4B, the main controller 120 functionally includes a target speed setting section 121, a maximum speed setting section 122, and a gearshift control section 123.

Figure 5:
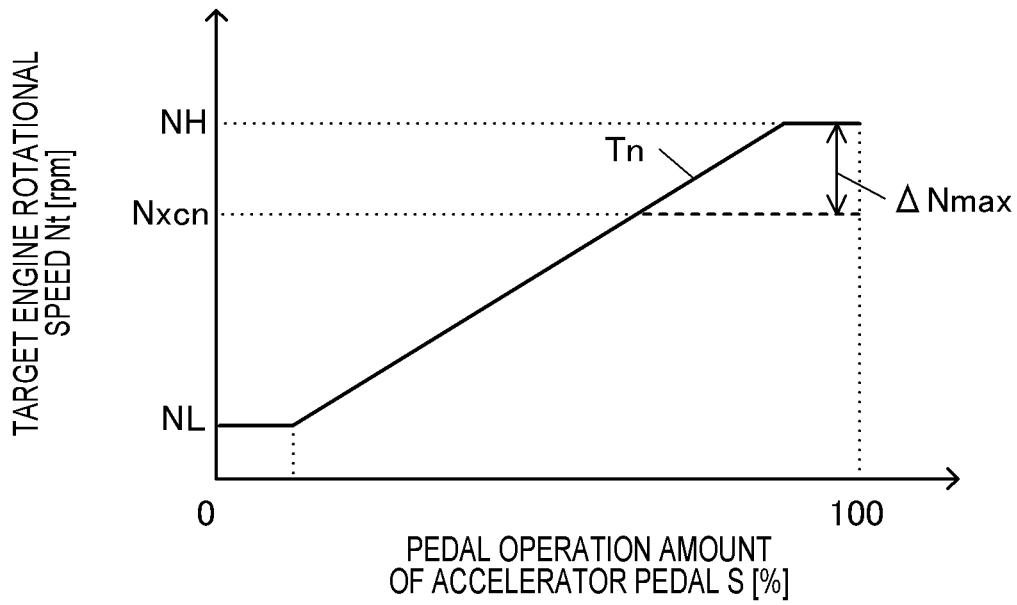
FIG. 5 is a diagram showing a relationship between an amount of accelerator pedal operation and target engine rotational speed.

The target speed setting section 121 sets target engine rotational speed Nt of the engine 190 according to the amount of pedal operation of the accelerator pedal 21 detected by the accelerator operation amount detector 21a. FIG. 5 is a diagram showing a relationship between the pedal operation amount S of the accelerator pedal 21 and the target engine rotational speed Nt. In FIG. 5, the solid line represents an example of characteristics in case the rotational speed of the engine 190 is not limited (characteristics under a no-limit-imposed condition) and the broken line represents an example of characteristics in case the rotational speed of engine 190 is limited (characteristics under a limit-imposed condition).

A storage device of the main controller 120 stores a table Tn of characteristics of the target engine rotational speed Nt corresponding to the pedal operation amount S of the accelerator pedal 21 shown in FIG. 5. By referring to the table Tn, the target speed setting section 121 (see FIG. 4B) sets the target engine rotational speed Nt based on the pedal operation amount S of the accelerator pedal 21 detected by the accelerator operation amount detector 21a.

In case the accelerator pedal 21 is not operated (0%), the target engine rotational speed Nt is set to the low idling rotational speed NL. The target engine rotational speed Nt increases with increases in the pedal operation amount S of the accelerator pedal 21. In case the pedal is fully depressed (100%), the target engine rotational speed Nt reaches the high idling rotational speed NH. That is, by operating the accelerator pedal 21, the target engine rotational speed Nt can be varied between the low idling rotational speed NL (e.g., about 800 rpm) and the high idling rotational speed NH (e.g., about 2000 rpm).

As shown in FIG. 4A, the main controller 120 outputs a control signal corresponding to the set target engine rotational speed Nt to the engine controller 130. The engine controller 130 is connected with a rotational speed sensor 131 adapted to detect actual engine rotational speed of the engine 190. The engine controller 130 compares the actual engine rotational speed of the engine 190 detected by the rotational speed sensor 131 with the target engine rotational speed Nt from the main controller 120, and controls the fuel injection device (governor) 135 to bring the actual engine rotational speed of the engine 190 close to the target engine rotational speed Nt.

Figure 6:
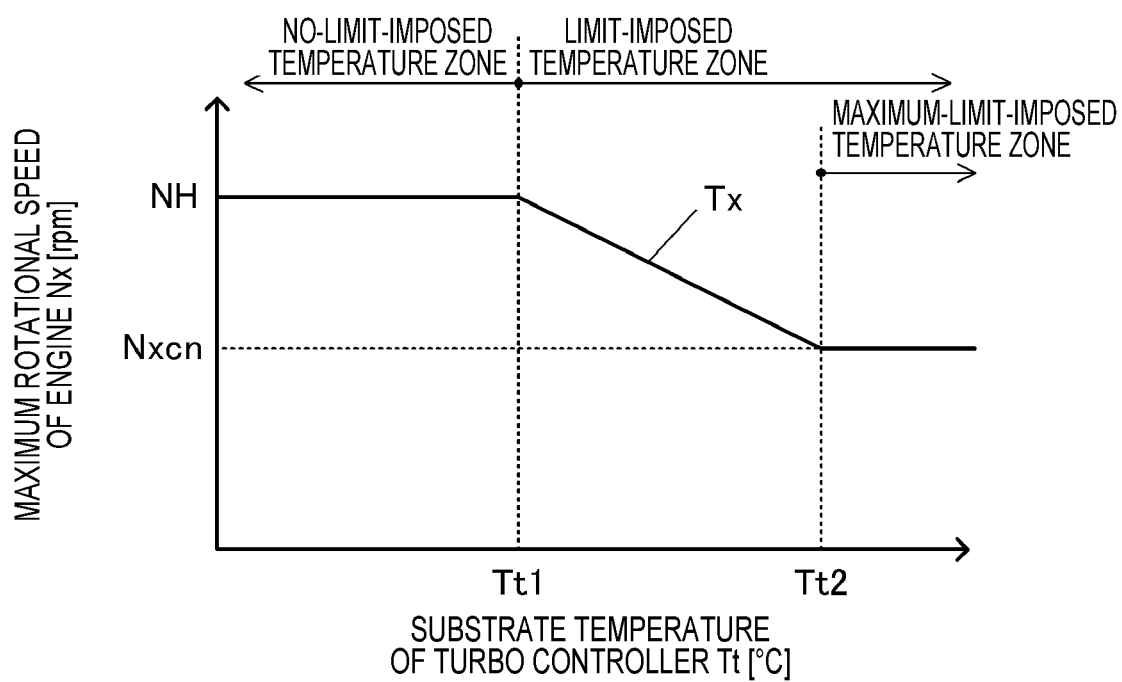
FIG. 6 is a diagram showing a relationship between substrate temperature of a turbo controller and maximum rotational speed of the engine.

FIG. 6 is a diagram showing a relationship between the substrate temperature Tt of the turbo controller 140 and the maximum rotational speed Nx of the engine 190. A storage device of the main controller 120 stores a table Tx of characteristics of the maximum rotational speed Nx of the engine 190 corresponding to the substrate temperature Tt of the turbo controller 140 shown in FIG. 6. By referring to the table Tx, the maximum speed setting section 122 (see FIG. 4B) sets the maximum rotational speed Nx of the engine 190 based on the substrate temperature Tt detected by the substrate temperature sensor 161.

In case the substrate temperature Tt is equal to or lower than a first threshold Tt1, the maximum rotational speed Nx is set to the high idling rotational speed NH. In case the substrate temperature Tt becomes higher than the first threshold Tt1, the maximum rotational speed Nx becomes lower than the high idling rotational speed NH. That is, the maximum rotational speed Nx of the engine 190 becomes limited in case the substrate temperature Tt exceeds the first threshold Tt1. In case the substrate temperature Tt becomes higher than the first threshold Tt1, the maximum rotational speed Nx decreases gradually with increases in the substrate temperature Tt. In case the substrate temperature Tt becomes equal to or higher than a second threshold Tt2, the maximum rotational speed Nx of the engine 190 is set to the lower limit Nxcn. That is, with the high idling rotational speed NH being used as an upper limit, an allowable variation width ΔN (=NH−Nxcn) of the maximum rotational speed Nx of the engine 190 varies within a range of the upper limit NH to the lower limit Nxcn.

The first threshold Tt1 is a temperature corresponding to an upper limit of a temperature zone in which the maximum rotational speed Nx of the engine 190 is not limited (hereinafter referred to as a no-limit-imposed temperature zone), i.e., a lower limit of a temperature zone in which the maximum rotational speed Nx of the engine 190 is limited (hereinafter referred to as a limit-imposed temperature zone), and is, for example, about 110° C. The second threshold Tt2 is a temperature corresponding to a lower limit of a temperature zone in which the maximum rotational speed Nx of the engine 190 is set to the lower limit Nxcn (hereinafter referred to as a maximum-limit-imposed temperature zone), and is, set to a temperature higher than the first threshold Tt1, for example, to about 125° C.

As shown in FIG. 5, the lower limit Nxcn of the maximum rotational speed Nx of the engine 190 is a value (e.g., about 80 to 90% the high idling rotational speed NH) lower than the high idling rotational speed NH by a limit ΔNmax and is a value sufficiently higher than the low idling rotational speed NL. In the present embodiment, in case the accelerator pedal 21 is fully depressed, the maximum rotational speed Nx of the engine 190 is limited between the lower limit Nxcn and the upper limit (high idling rotational speed) NH according to changes in the substrate temperature Tt of the turbo controller 140. As a result, maximum vehicle speed of the wheel loader (the own vehicle) 100 is limited.

Figure 7:
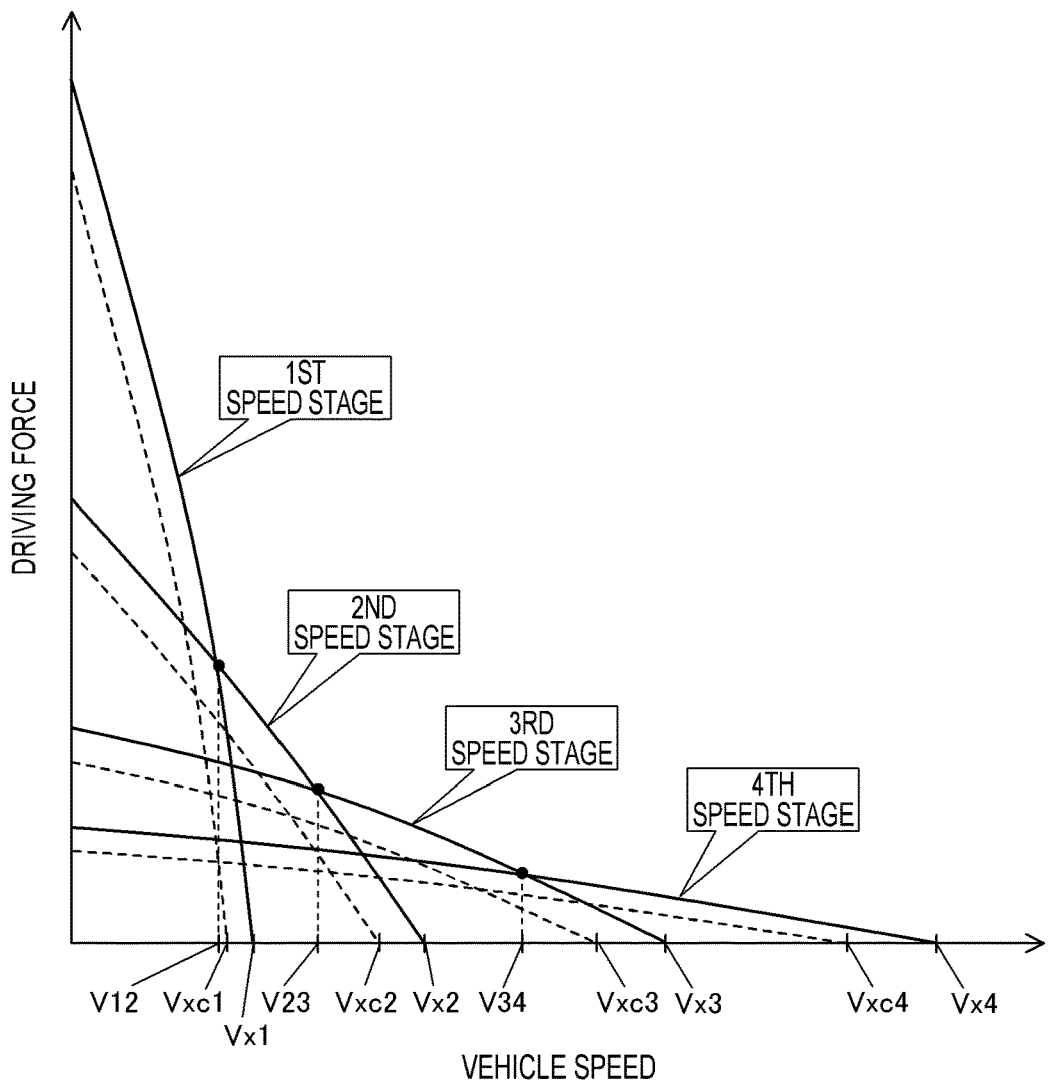
FIG. 7 is a vehicle performance diagram showing a relationship between vehicle speed and driving force in case the accelerator pedal is fully depressed.

FIG. 7 is a vehicle performance diagram showing a relationship between vehicle speed and driving force in case the accelerator pedal 21 is fully depressed. In FIG. 7, the solid lines represent characteristics in case the maximum rotational speed of the engine 190 is set to the high idling rotational speed NH, i.e., in case the rotational speed of the engine 190 is not limited (characteristics under a no-limit-imposed condition). In FIG. 7, the broken lines represent characteristics in case the maximum rotational speed of the engine 190 is set to the lower limit Nxcn (characteristics under a limit-imposed condition).

In the present embodiment, in case the substrate temperature Tt exceeds the first threshold Tt1, the maximum rotational speed Nx is limited to a low speed side. That is, as illustrated in FIG. 7, the characteristics under the limit-imposed condition (broken lines) are shifted leftward from the characteristics under the no-limit-imposed condition (solid lines). In case the two conditions are compared at same speeds, the travel driving force is smaller under the limit-imposed condition than under the no-limit-imposed condition in any of the speed stages. Also, in each of the speed stages, a lower limit Vxci of the maximum vehicle speed under the limit-imposed condition is lower than an upper limit Vxi of the maximum vehicle speed under the no-limit-imposed condition, where i is an integer which represents the speed stage (i=1, 2, 3, 4).

In this way, by limiting the maximum rotational speed Nx of the engine 190 between the lower limit Nxcn and the high idling rotational speed NH, which is an upper limit, the present embodiment can limit the maximum vehicle speed of the wheel loader 100 between the lower limit Vxci and upper limit Vxi in each speed stage.

Figure 8:
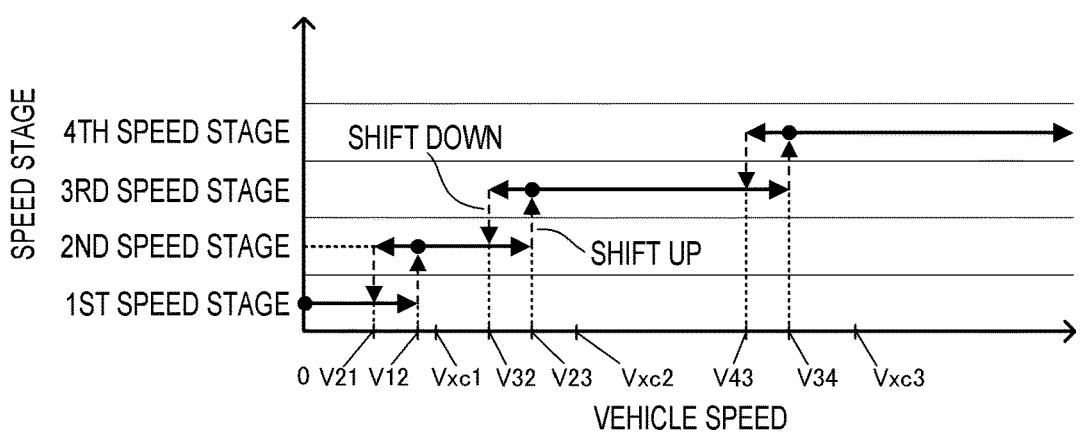
FIG. 8 is a diagram showing a relationship between vehicle speed and speed stage.

FIG. 8 is a diagram showing a relationship between vehicle speed V and speed stage. In the present embodiment, the main controller 120 outputs a control signal to the transmission control device 20 according to the vehicle speed V detected by the vehicle speed sensor 24, thereby causing the transmission 3 to shift gears.

Upshift control is as follows.

In case the vehicle speed V increases to gearshift-permitting vehicle speed V12, the gearshift control section 123 (see FIG. 4B) makes the transmission control device 20 shift up the speed stage from the first stage to the second stage. In case the vehicle speed V increases to gearshift-permitting vehicle speed V23, the gearshift control section 123 makes the transmission control device 20 shift up the speed stage from the second stage to the third stage. In case the vehicle speed V increases to gearshift-permitting vehicle speed V34, the gearshift control section 123 makes the transmission control device 20 shift up the speed stage from the third stage to the fourth stage. Note that a storage device of the main controller 120 prestores the gearshift-permitting vehicle speeds V12, V23, and V34 as thresholds at which upshift is permitted. Each of the gearshift-permitting vehicle speeds V12, V23, and V34 is set to vehicle speed at an intersection of vehicle performance curves (solid lines) in the non-limited state (see FIG. 7).

Downshift control is as follows.

In case the vehicle speed V decreases to gearshift-permitting vehicle speed V43, the gearshift control section 123 makes the transmission control device 20 shift down the speed stage from the fourth stage to the third stage. In case the vehicle speed V decreases to gearshift-permitting vehicle speed V32, the gearshift control section 123 makes the transmission control device 20 shift down the speed stage from the third stage to the second stage. In case the vehicle speed V decreases to gearshift-permitting vehicle speed V21, the gearshift control section 123 makes the transmission control device 20 shift down the speed stage from the second stage to the first stage. Note that the storage device of the main controller 120 prestores the gearshift-permitting vehicle speeds V43, V32, and V21 as thresholds at which downshift is permitted.

In the present embodiment, for stable gearshift, the upshift-permitting vehicle speeds are set higher than the respective downshift-permitting vehicle speeds (V12>V21, V23>V32, and V34>V43). The transmission control device 20 is made up of solenoid valves corresponding to the speed stages and is driven by a control signal from the main controller 120.

In the present embodiment, the upshift-permitting vehicle speeds are set lower than the lower limit Vxci of the maximum vehicle speed (where i is an integer which represents the speed stage (i=1, 2, 3, 4)). That is, magnitude relationships between the upshift-permitting vehicle speeds and the lower limits of the maximum vehicle speed in the respective speed stages are as follows: V12<Vxc1, V23<Vxc2, and V34<Vxc3.

Figure 9:
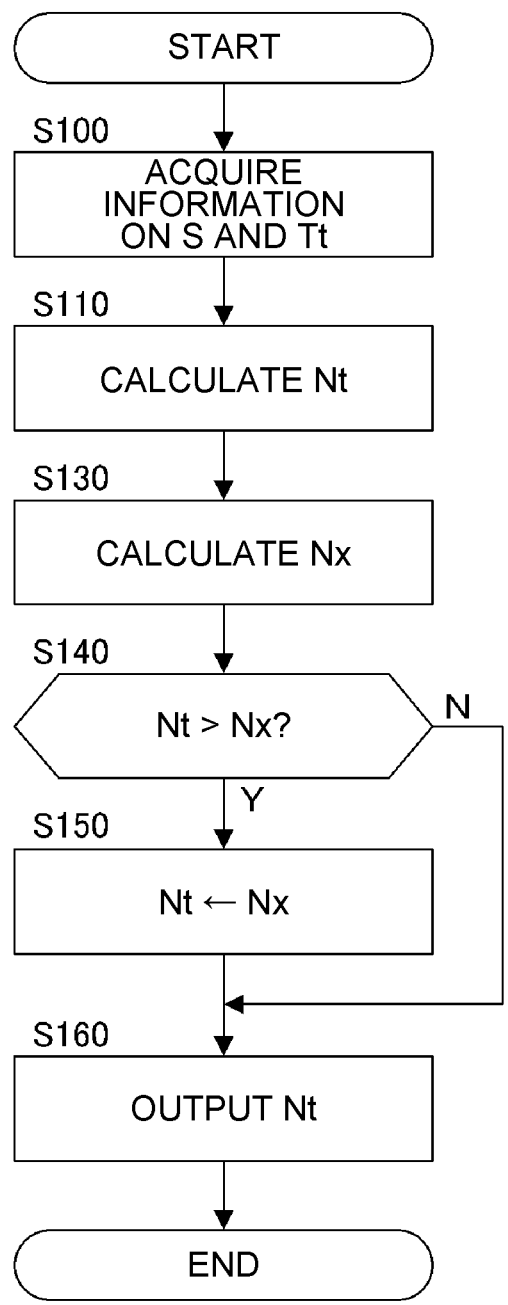
FIG. 9 is a flowchart showing an operation of a limiting control process on maximum rotational speed of an engine performed by a main controller of a wheel loader according to a first embodiment of the present invention.

Limiting control of the maximum rotational speed Nx of the engine 190 will be described below with reference to FIG. 9. FIG. 9 is a flowchart showing an operation of a limiting control process on the maximum rotational speed Nx of the engine 190 performed by the main controller 120 of the wheel loader 100 according to the first embodiment of the present invention. In case an ignition switch (not illustrated) is turned on, non-illustrated initialization is performed, and then a program configured to perform the process shown in FIG. 9 is started and executed repeatedly by the main controller 120 on a predetermined control cycle.

In step S100, the main controller 120 reads information on the pedal operation amount S of the accelerator pedal 21 detected by the accelerator operation amount detector 21a and information on the substrate temperature Tt of the control board of the turbo controller 140 detected by the substrate temperature sensor 161, stores the information in the storage device, and then goes to step S110.

In step S110, by referring to the table Tn of the target engine rotational speed Nt in FIG. 5, the main controller 120 calculates the target engine rotational speed Nt based on the pedal operation amount S, and then goes to step S130.

In step S130, by referring to the table Tx of the maximum rotational speed Nx of the engine 190 in FIG. 6, the main controller 120 calculates the maximum rotational speed Nx of the engine 190 based on the substrate temperature Tt, and then goes to step S140.

In step S140, the main controller 120 determines whether the target engine rotational speed Nt calculated in step S110 is higher than the maximum rotational speed Nx calculated in step S130. If an affirmative determination is made in step S140, the main controller 120 goes to step S150, and if a negative determination is made in step S140, the main controller 120 goes to step S160. Note that an affirmative determination is made in step S140 in case the maximum rotational speed Nx of the engine is limited to a predetermined value lower than the high idling rotational speed NH and the target engine rotational speed Nt set based on the pedal operation amount S is higher than the predetermined value.

In step S150, the main controller 120 sets the maximum rotational speed Nx calculated in step S130 as the target engine rotational speed Nt and then goes to step S160. That is, in case the process of step S150 is performed, the target engine rotational speed Nt is stored in the storage device by overwriting the old one. In step S160, the main controller 120 outputs a control signal corresponding to the target engine rotational speed Nt to the engine controller 130, and finishes the process shown in the flowchart of FIG. 9. The engine controller 130 controls the fuel injection device 135 so as to bring the actual engine rotational speed of the engine 190 close to the target engine rotational speed Nt outputted from the main controller 120.

The operation of the first embodiment is summarized as follows. In case the substrate temperature Tt is equal to or lower than the first threshold Tt1, the maximum rotational speed Nx of the engine 190 is not limited (see FIG. 6). The target engine rotational speed Nt in case the accelerator pedal 21 is fully depressed is set to the high idling rotational speed NH and the actual engine rotational speed is controlled at the high idling rotational speed NH (No in step S140->S160).

If high-load work (e.g., V-shape loading) is carried out repeatedly for a long time, temperature of the supercharger 50, i.e., temperature of the turbine 51, compressor 52 and the like rises. Heat generated by the turbine 51, compressor 52 and the like is transmitted to the control board of the turbo controller 140 through the casing which houses the turbine 51, compressor 52 and the like as well as through the turbo actuator 145. In case the substrate temperature Tt of the control board of the turbo controller 140 exceeds the first threshold Tt1, the maximum rotational speed Nx of the engine 190 is limited (see FIG. 6). For example, if the substrate temperature Tt is equal to or higher than a second threshold Tt2, the target engine rotational speed Nt in case the accelerator pedal 21 is fully depressed is set to the lower limit Nxcn of the maximum rotational speed Nx and the actual engine rotational speed is controlled at the lower limit Nxcn of the maximum rotational speed Nx (Yes in S140->S150->S160).

Note that V-shape loading is excavation/loading work, of which one cycle is made up operations (a) to (d) below.

(a) An operator advances the wheel loader 100 toward natural ground, digs the bucket 112 into the natural ground, and carries out excavation work by operating the bucket 112 and arm 111.

(b) In case the excavation work is finished, the operator backs the wheel loader 100 once.

(c) The operator advances the wheel loader 100 toward a dump truck, stops the wheel loader 100 in front of the dump truck, and loads sand or the like in the bucket 112 into the dump truck.

(d) The operator backs the wheel loader 100 to the original position.

According to the present embodiment, since the maximum rotational speed of the engine 190 is limited and moreover the maximum vehicle speed of the wheel loader 100 is limited, cycle time of work becomes longer. Consequently, engine load is reduced and the substrate temperature Tt of the control board of the turbo controller 140 falls.

In case the substrate temperature Tt falls to or below the first threshold Tt1, the maximum rotational speed Nx of the engine 190 is set to the high idling rotational speed NH (No in step S140->S160). In other words, in case the substrate temperature Tt falls to or below the first threshold Tt1, the main controller 120 removes the limit on the maximum rotational speed Nx, switching the state of the engine 190 from a limited state back to a non-limited state.

The embodiment described above provides the following operations and effects.

(1) The wheel loader 100 includes the variable geometry supercharger 50 capable of changing boost pressure by adjusting an opening area of an exhaust gas flow path running from the engine 190 to the turbine 51, and the front working device 102 driven by the pressure oil discharged from the working pump 7. The supercharger 50 is controlled by the turbo controller 140 and the substrate temperature Tt of the turbo controller 140 is detected by the substrate temperature sensor 161. The main controller 120 limits the maximum rotational speed of the engine 190 to a lower level in case the substrate temperature Tt is above the first threshold Tt1 than case the substrate temperature Tt is below the first threshold Tt1. In the present embodiment, in case the maximum rotational speed Nx of the engine 190 is limited, the maximum vehicle speed of the wheel loader 100 is limited as well.

In case the maximum rotational speed Nx of the engine 190 is limited, a discharge volume of the working pump 7 is reduced, limiting a maximum value of operating speed of the working hydraulic cylinder 18 and reducing operating speed of the front working device 102. That is, in case the front working device 102 is caused to perform a predetermined operation, operating time from start to end of the operation becomes longer. Also, in case the maximum vehicle speed of the wheel loader 100 is limited, travel time of the wheel loader 100 at the worksite becomes longer.

Consequently, because the cycle time of work becomes longer, reducing the engine load, thermal load of the supercharger 50 decreases, making it possible to decrease the substrate temperature Tt of the control board of the turbo controller 140. Since rises in the substrate temperature Tt of the control board of the turbo controller 140 can be curbed, the life of the turbo controller 140 can be extended. As a result, emission controls can be met for an extended period of time.

(2) Now, there is strong demand that the work vehicle minimize interruptions of work. If the maximum rotational speed of the engine 190 or the maximum vehicle speed of the vehicle is not limited even if the temperature of the turbo controller 140 is higher than the second threshold Tt2, the turbo controller 140 might break down, failing to control the boost pressure appropriately. This gives rise to the need to interrupt the operation of the wheel loader 100 for repair work. In the present embodiment, the cycle time of work is longer in the limited state than in the non-limited state, but interruptions of work can be avoided.

(3) The wheel loader 100 is equipped with the vehicle speed sensor 24 adapted to detect the vehicle speed of the own vehicle. In case the vehicle speed V detected by the vehicle speed sensor 24 becomes higher than the upshift-permitting vehicle speed (V12, V23, V34), the main controller 120 makes the transmission control device 20 shift up the speed stage of the transmission 3. The main controller 120 limits the maximum vehicle speed of the wheel loader 100 between the lower limit (Vxci, where i is an integer which represents the speed stage) and the upper limit (Vxi, where i is an integer which represents the speed stage). The upshift-permitting vehicle speed in each speed stage is set lower than the lower limit of the maximum vehicle speed of the wheel loader 100 (V12<Vxc1, V23<Vxc2, V34<Vxc3) in the given speed stage.

Consequently, even if the maximum vehicle speed of the wheel loader 100 is limited to the lower limit Vxci, in case the vehicle is traveling on a flat or a downward slope, the speed stage of the transmission 3 can be shifted up. This makes it possible to reduce the travel time of the wheel loader 100 compared to case upshift is disabled, and thereby improve working efficiency.

(4) The wheel loader 100 includes the radiator (heat exchanger) 14 adapted to cool cooling water (refrigerant), the cooling fan 13 adapted to generate cooling air of the radiator 14, the fan pump 8 driven by the engine 190, and the fan motor 11 driven by the pressure oil discharged from the fan pump 8 and adapted to rotate the cooling fan 13. The main controller 120 limits the maximum rotational speed Nx of the engine 190 between the lower limit Nxcn and the high idling rotational speed NH, which is an upper limit. As shown in FIG. 3, the set pressure of the relief valve 9 is established such that the maximum rotational speed Nfx of the cooling fan 13 will be maintained even if the maximum rotational speed Nx of the engine 190 is limited to the lower limit Nxcn.

Consequently, in case the accelerator pedal 21 is fully depressed, even if the maximum rotational speed Nx of the engine 190 is limited to the lower limit Nxcn from the high idling rotational speed NH, the rotational speed Nf of the cooling fan 13 does not decrease (Nf=Nfx). That is, according to the present embodiment, the cooling fan 13 can maintain cooling performance without being affected by the limit on the maximum rotational speed Nx of the engine 190. This makes it possible to cool the turbo controller 140 effectively in case the maximum rotational speed of the engine 190 is limited.

(5) After limiting the maximum rotational speed Nx of the engine 190, in case the substrate temperature Tt of the control board of the turbo controller 140 falls below the first threshold Tt1, the main controller 120 removes the limit described above. Consequently, in case the temperature of the turbo controller 140 falls, the state of the engine 190 can automatically be returned to the non-limited state, allowing work to be done using normal cycle time. This makes it possible to improve working efficiency.

(6) The turbo controller 140 is cooled by the cooling water of the engine 190. In case the load on the engine 190 is reduced by limiting the maximum rotational speed of the engine 190 and maximum speed of the vehicle, the cooling water temperature falls as well, and thus the temperature of the turbo controller 140 can be reduced more effectively than case the turbo controller 140 is not cooled by cooling water. Also, the use of the cooling water of the engine 190 eliminates the need to provide refrigerant or a cooling mechanism exclusively for use to cool the turbo controller 140.

—Variation of First Embodiment—

Whereas in the example described in the first embodiment, in case the substrate temperature Tt of the turbo controller 140 exceeds Tt1, the allowable variation width ΔN of the maximum rotational speed of the engine 190 increases gradually with increases in the substrate temperature Tt, the present invention is not limited to this.

For example, in case the substrate temperature Tt of the turbo controller 140 exceeds the first threshold Tt1, the maximum rotational speed Nx of the engine 190 may be changed discontinuously to the lower limit Nxcn prestored in the storage device of the main controller 120. In this case, if the limit is removed in case the substrate temperature Tt falls to or below the first threshold Tt1, the limited state and non-limited state might be repeated alternately near the first threshold Tt1. Therefore, preferably a temperature lower than the first threshold Tt1 is set in advance as a limit removal condition. That is, preferably hysteresis is provided by making the temperature used as a limiting condition and the temperature used as a limit removal condition differ from each other.

Second Embodiment

A second embodiment of the present invention will be described with reference to FIGS. 10A, 10B, 11, and 12. Note that the same or equivalent components as/to those of the first embodiment are denoted by the same reference numerals as the corresponding components of the first embodiment, and differences from the first embodiment will mainly be described. In the first embodiment, the maximum rotational speed Nx of the engine 190 is limited using a table Tx of the maximum rotational speed Nx of the engine 190 associated with substrate temperatures Tt. In contrast, in the second embodiment, as shown in FIGS. 10A and 10B, the maximum rotational speed Nx of the engine 190 is limited using tables Tnw1 and Tnw2 of the maximum rotational speed Nx of the engine 190 associated with cooling water temperatures Tw.

Figure 12:
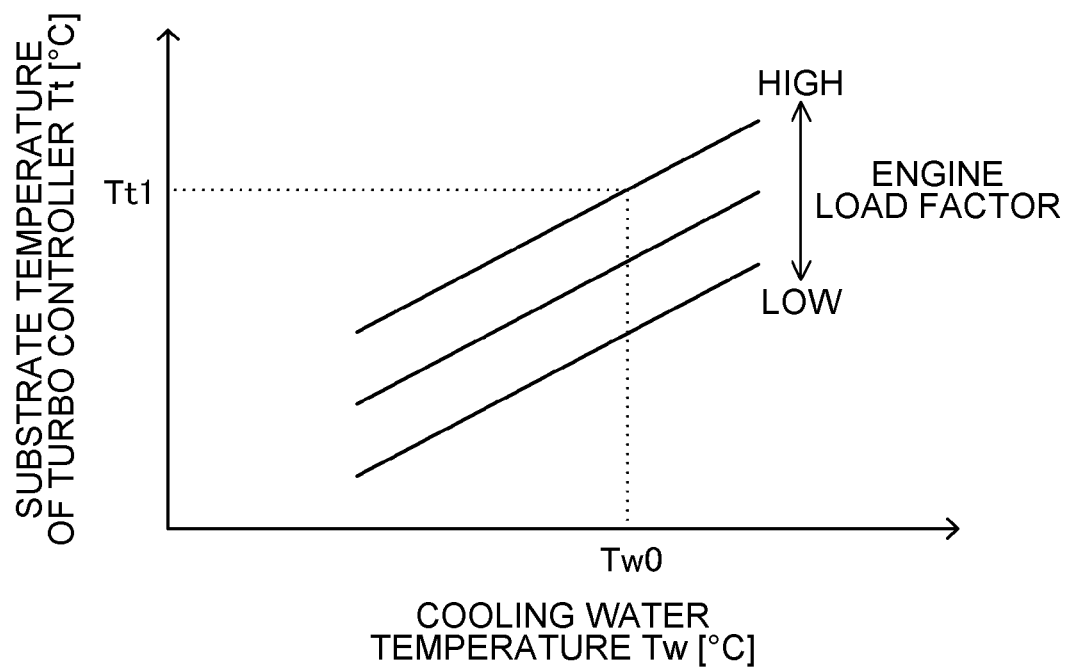
FIG. 12 is a diagram showing relationships among engine cooling water temperature, turbo controller control board temperature, and engine load factor.

There is a correlation between the substrate temperature Tt and cooling water temperature Tw. For example, as shown in FIG. 12, the substrate temperature Tt has a proportional relationship with the cooling water temperature Tw. Here, the substrate temperature Tt also has a proportional relationship with the load factor of the engine 190. Therefore, in order to decrease the substrate temperature Tt, it is useful to reduce the cooling water temperature Tw and the load factor of the engine 190. Thus, in the second embodiment, the maximum rotational speed Nx of the engine 190 is limited based on the cooling water temperature Tw.

Figure 10A:
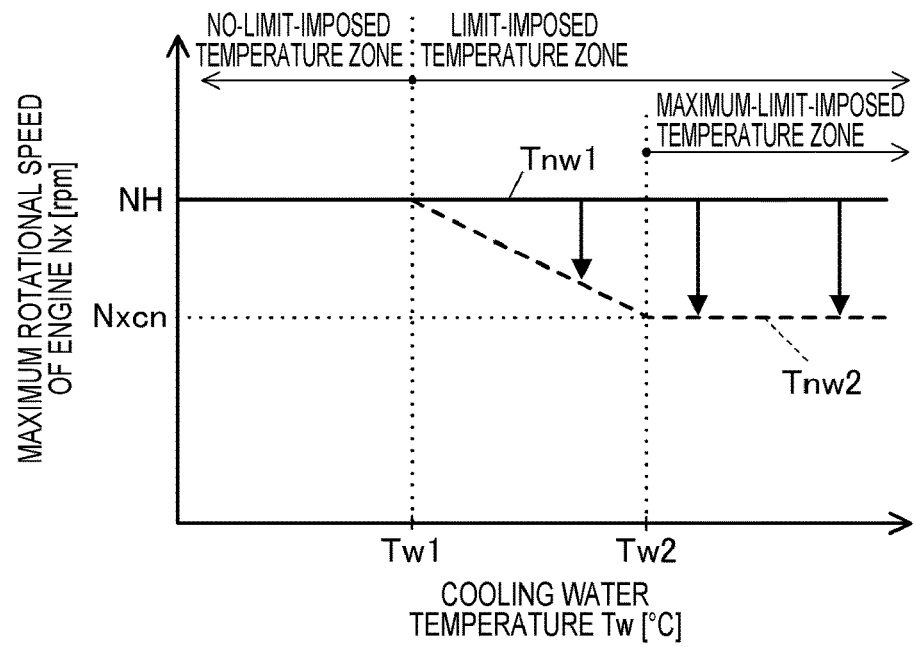
FIG. 10A is a first diagram showing a relationship between cooling water temperature for the engine and maximum rotational speed of the engine.
Figure 10B:
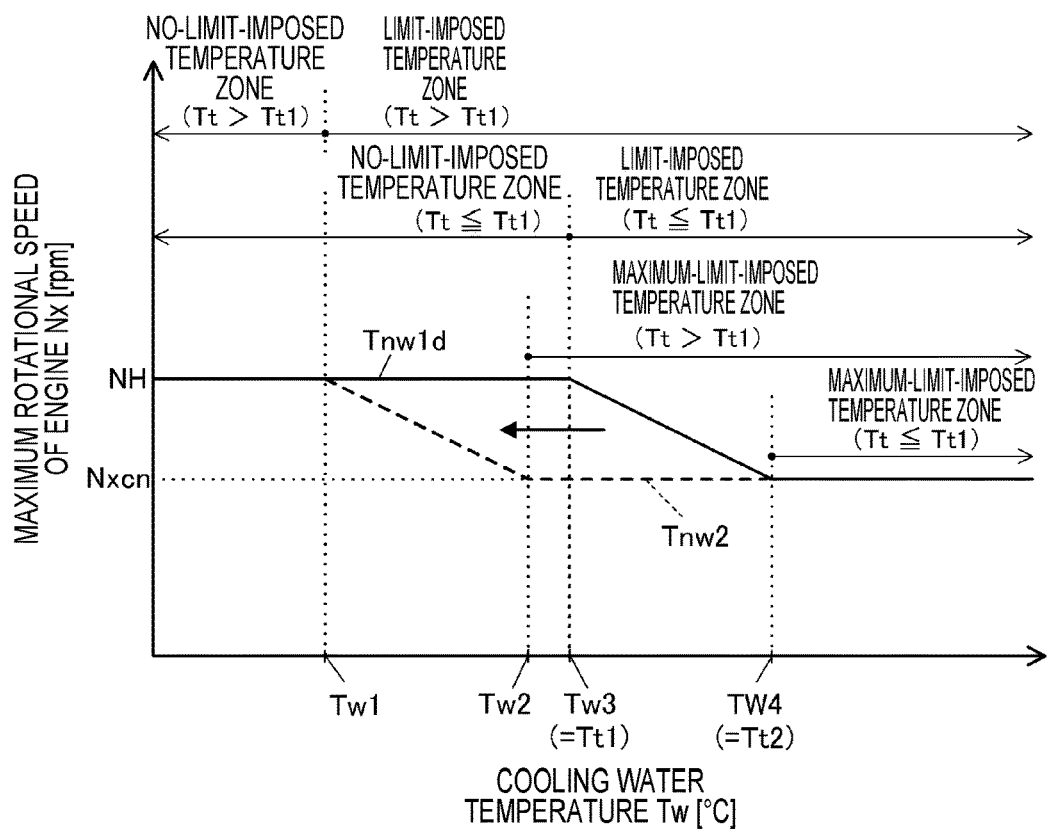
FIG. 10B is a second diagram showing a relationship between cooling water temperature for the engine and maximum rotational speed of the engine.

FIG. 10A is a first diagram showing a relationship between the cooling water temperature Tw for the engine and the maximum rotational speed Nx of the engine 190. The storage device of the main controller 120 stores tables Tnw1 and Tnw2 of characteristics of the maximum rotational speed Nx of the engine 190 for the cooling water temperature Tw shown in FIG. 10A. The maximum speed setting section 122 (see FIG. 4B) determines whether the substrate temperature Tt of the control board of the turbo controller 140 is higher than the first threshold Tt1.

In case it is determined that the substrate temperature Tt is equal to or lower than the first threshold Tt1, the maximum speed setting section 122 selects the table Tnw1 for use under a no-limit-imposed condition as a calculation table. In case it is determined that the substrate temperature Tt is higher than the first threshold Tt1, the maximum speed setting section 122 selects the table Tnw2 for use under a limit-imposed condition as a calculation table.

By referring to the selected table (Tnw1 or Tnw2) for use in calculation, the maximum speed setting section 122 sets the maximum rotational speed Nx of the engine 190 based on the cooling water temperature Tw detected by the cooling water temperature sensor 162.

In case the table Tnw1 is selected, the maximum rotational speed Nx is set to the high idling rotational speed NH regardless of the cooling water temperature Tw. That is, the maximum rotational speed Nx is not limited.

In case the table Tnw2 is selected, the maximum rotational speed Nx is set as follows according to the cooling water temperature Tw. In case the cooling water temperature Tw is equal to or lower than a first temperature Tw1, the maximum rotational speed Nx is set to the high idling rotational speed NH. In case the cooling water temperature Tw becomes higher than the first temperature Tw1, the maximum rotational speed Nx becomes lower than the high idling rotational speed NH. That is, the maximum rotational speed Nx of the engine 190 is limited in case the substrate temperature Tt becomes higher than the first threshold Tt1, and the cooling water temperature Tw becomes higher than the first temperature Tw1. In case the cooling water temperature Tw becomes higher than the first temperature Tw1, the maximum rotational speed Nx decreases gradually with increases in the cooling water temperature Tw. In case the cooling water temperature Tw becomes equal to or higher than a second temperature Tw2, the maximum rotational speed Nx of the engine 190 is set to the lower limit Nxcn. That is, with the high idling rotational speed NH being used as an upper limit, an allowable variation width ΔN (=NH−Nxcn) of the maximum rotational speed Nx of the engine 190 varies within a range of the upper limit NH to the lower limit Nxcn.

The first temperature Tw1 is a cooling water temperature corresponding to an upper limit of the no-limit-imposed temperature zone, i.e., a lower limit of the limit-imposed temperature zone, and is, for example, about 90° C. The second temperature Tw2 is a cooling water temperature corresponding to a lower limit of the maximum-limit-imposed temperature zone, is higher than the first temperature Tw1, and is, for example, about 100° C.

Figure 11:
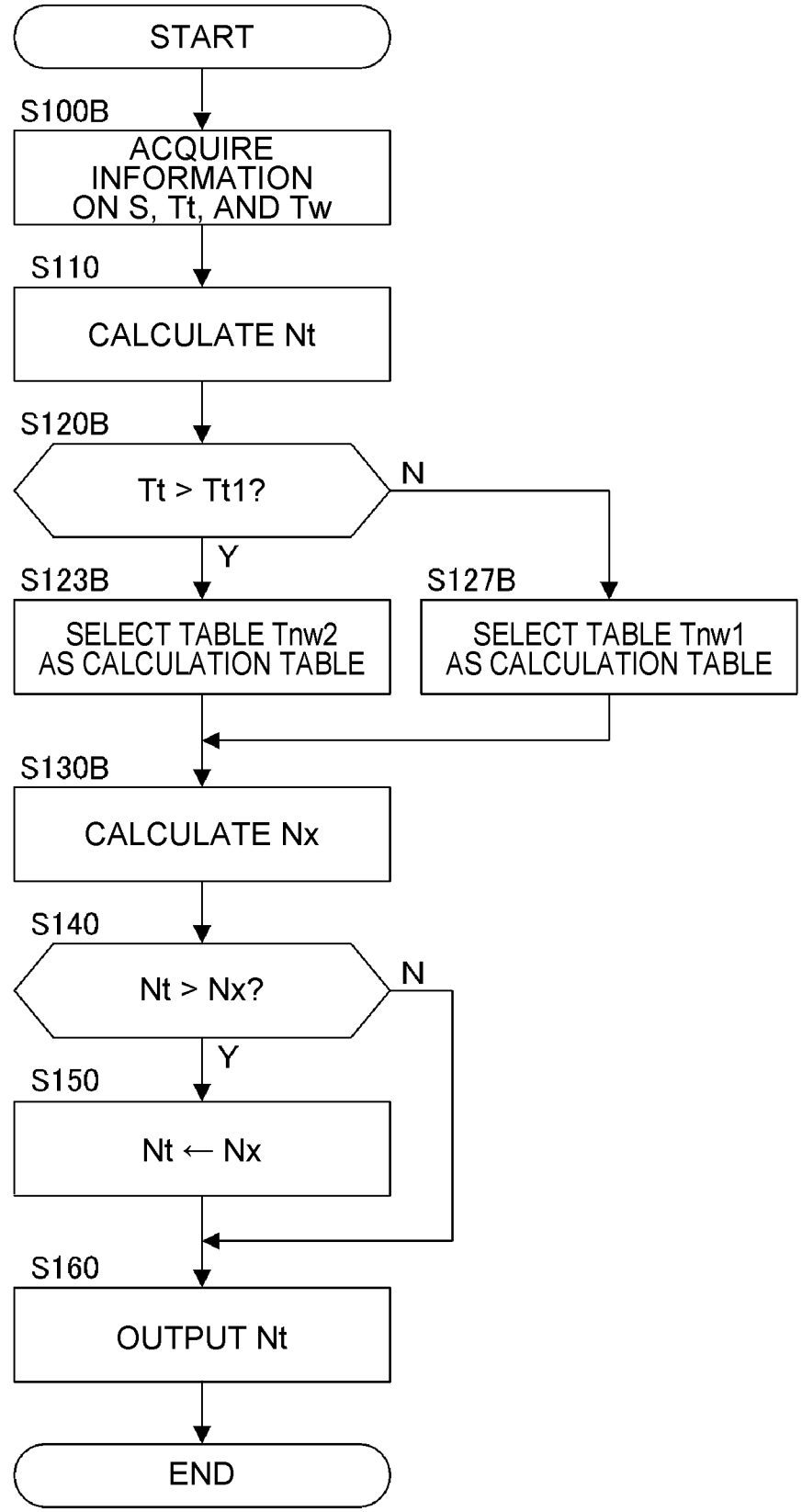
FIG. 11 is a flowchart showing an operation of a limiting control process on maximum rotational speed of an engine performed by a main controller of a wheel loader according to a second embodiment of the present invention.

FIG. 11 is a flowchart showing an operation of a limiting control process on the maximum rotational speed Nx of the engine 190 performed by the main controller 120 of the wheel loader 100 according to the second embodiment of the present invention. The flowchart of FIG. 11 includes the processes of steps S100B and S130B instead of the steps S100 and S130 of the flowchart of FIG. 9. Furthermore, the processes of steps S120B, S123B, and S127B are additionally provided between steps S110 and S130B.

As shown in FIG. 11, in step S100B, the main controller 120 reads information on the pedal operation amount S of the accelerator pedal 21 detected by the accelerator operation amount detector 21a, information on the substrate temperature Tt of the control board of the turbo controller 140 detected by the substrate temperature sensor 161, and information on the cooling water temperature Tw detected by the cooling water temperature sensor 162, stores the information in the storage device, and then goes to step S110.

In case a target engine rotational speed calculation process in step S110 is finished, the main controller 120 goes to step S120B, in which the main controller 120 determines whether the substrate temperature Tt is higher than the first threshold Tt1. If an affirmative determination is made in step S120B, the main controller 120 goes to step S123B, and if a negative determination is made in step S120B, the main controller 120 goes to step S127B.

In step S123B, the main controller 120 selects the table Tnw2 as a calculation table, and then goes to step S130B. In step S127B, the main controller 120 selects the table Tnw1 as a calculation table and then goes to step S130B.

In step S130B, by referring to the calculation table selected in step S123B or S127B, the main controller 120 calculates the maximum rotational speed Nx of the engine 190 based on the cooling water temperature Tw and then goes to step S140.

In this way, in the second embodiment, in case the substrate temperature Tt of the control board of the turbo controller 140 is higher than the first threshold Tt1, the main controller 120 limits the maximum rotational speed Nx of the engine 190 based on the cooling water temperature Tw. In the present embodiment, in case the maximum rotational speed Nx of the engine 190 is limited, the maximum vehicle speed of the wheel loader 100 is limited as well. Consequently, operations and effects similar to those of the first embodiment are achieved.

The second embodiment configured as described above further achieves the following operations and effects.

(7) Since characteristics of the table Tnw2 are established in advance by taking the correlation between the substrate temperature Tt and cooling water temperature Tw into consideration, even if the substrate temperature Tt of the control board of the turbo controller 140 is not detected by the main controller 120 in real time, the temperature of the turbo controller 140 can be reduced effectively.

Note that depending on a surrounding environment and operation condition of the engine 190, even if the cooling water temperature is kept constant (e.g., Tw0), as shown in FIG. 12, if the load factor of the engine falls, the substrate temperature Tt of the turbo controller 140 falls as well. According to the present embodiment, since the maximum rotational speed Nx of the engine 190 is limited to a low speed and the maximum vehicle speed of the wheel loader 100 is limited to a low speed, as described above, operating speed of the front working device 102 and travel speed of the wheel loader 100 are reduced, prolonging the cycle time of work and reducing the load on the engine 190. Therefore, even if the cooling water temperature is the same, the temperature of the turbo controller 140 can be reduced. Note that since the cooling water temperature Tw has a proportional relationship with the load factor of the engine 190, normally by reducing the load factor of the engine 190, the cooling water temperature Tw can be reduced and the temperature of the turbo controller 140 can be reduced more effectively.

—Variation 1 of Second Embodiment—

Whereas in the example described in the second embodiment, characteristics (see FIG. 10A) of the table Tnw1 for use under the no-limit-imposed condition are such that the maximum rotational speed Nx of the engine 190 will be set to the high idling rotational speed NH regardless of the cooling water temperature Tw, the present invention is not limited to this. The characteristics of the table for use under the no-limit-imposed condition may vary according to the cooling water temperature Tw.

FIG. 10B is a diagram showing a table according to variation 1 of the second embodiment and showing a relationship between the cooling water temperature Tw and the maximum rotational speed Nx of the engine 190 as in the case of FIG. 10A. In the present variation, instead of the table Tnw1 shown in FIG. 10A, a table Tnw1d is stored in the storage device as a table for use under the no-limit-imposed condition. In case the table Tnw1d is selected as a calculation table by the maximum speed setting section 122, the maximum rotational speed Nx is set as follows according to the cooling water temperature Tw.

In case the cooling water temperature Tw is equal to or lower than a third temperature Tw3, the maximum rotational speed Nx is set to the high idling rotational speed NH. In case the cooling water temperature Tw becomes higher than the third temperature Tw3, the maximum rotational speed Nx becomes lower than the high idling rotational speed NH. That is, in the present variation, even if the substrate temperature Tt does not exceed the first threshold Tt1, the maximum rotational speed Nx of the engine 190 is limited in case the cooling water temperature Tw becomes higher than the third temperature Tw3. In case the cooling water temperature Tw becomes higher than the third temperature Tw3, the maximum rotational speed Nx decreases gradually with increases in the cooling water temperature Tw. In case the cooling water temperature Tw becomes equal to or higher than a fourth temperature Tw4, the maximum rotational speed Nx of the engine 190 is set to the lower limit Nxcn.

The third temperature Tw3 is higher than the first temperature Tw1, and is, for example, approximately equal to the first threshold Tt1 described in the first embodiment. The third temperature Tw3 is a cooling water temperature corresponding to an upper limit of the no-limit-imposed temperature zone in case the substrate temperature Tt is equal to or lower than the first threshold Tt1, i.e., a lower limit of the limit-imposed temperature zone. The fourth temperature Tw4 is higher than the second temperature Tw2, and is, for example, approximately equal to the second threshold Tt2 described in the first embodiment. The fourth temperature Tw4 is a cooling water temperature corresponding to a lower limit of the maximum-limit-imposed temperature zone in case the substrate temperature Tt is equal to or lower than the first threshold Tt1.

Being configured as described above, variation 1 of the second embodiment achieves the following operations and effects in addition to operations and effects similar to those of the second embodiment.

(8) Even if the substrate temperature Tt of the control board of the turbo controller 140 is lower than the first threshold Tt1, in case the cooling water temperature Tw is higher than the third temperature Tw3, the main controller 120 limits the maximum rotational speed Nx of the engine 190 to a lower level than case the cooling water temperature Tw is lower than the third temperature Tw3. Even if the substrate temperature Tt is lower than the first threshold Tt1, in case work is done under a condition in which the cooling water temperature Tw is high, the temperature of the turbo controller 140 might become high in a short time. According to the present variation, in case the substrate temperature Tt is lower than the first threshold Tt1, temperature rises in the control board of the turbo controller 140 can be curbed by limiting the engine 190 based on the cooling water temperature Tw.

(9) Furthermore, temperature rises in the turbo controller 140 can be curbed as a backup in case trouble occurs with the substrate temperature sensor 161 or a signal line connecting the substrate temperature sensor 161 to the main controller 120.

—Variation 2 of Second Embodiment—

Whereas in the example described in the second embodiment, a detection signal corresponding to the substrate temperature Tt detected by the substrate temperature sensor 161 is inputted directly to the main controller 120, the present invention is not limited to this. For example, by inputting a detection signal corresponding to the substrate temperature Tt detected by the substrate temperature sensor 161 to the engine controller 130, the substrate temperature Tt may be monitored by the engine controller 130 in real time. In the present variation, the main controller 120 and the substrate temperature sensor 161 are not connected with each other directly.

The engine controller 130 determines whether the substrate temperature Tt of the control board of the turbo controller 140 is higher than the first threshold Tt1. In case the substrate temperature Tt changes from a state of being equal to or lower than the first threshold Tt1 to a state of being higher than the first threshold Tt1, the engine controller 130 starts counting time using a built-in timer.

The engine controller 130 determines whether a state in which the substrate temperature Tt is equal to or higher than the first threshold Tt1 has continued for a time threshold t0 or longer. In case the time measured (measured time t) by the built-in timer is equal to or longer than the time threshold t0, the engine controller 130 determines that a limit imposition condition has been met and enters a limit imposition mode. Once the limit imposition mode is entered, the engine controller 130 outputs a limit imposition signal to the main controller 120. The time threshold t0 is set, for example, to about 30 minutes and is prestored in the storage device of the engine controller 130.

In case the substrate temperature Tt of the control board of the turbo controller 140 falls to or below the first threshold Tt1 with the limit imposition mode set, the engine controller 130 determines that a limit removal condition has been met and enters a no-limit mode. Once the no-limit mode is entered, the engine controller 130 stops outputting the limit imposition signal to the main controller 120. Alternatively, a limit removal signal is outputted instead of the limit imposition signal.

The maximum speed setting section 122 (see FIG. 4) of the main controller 120 determines whether a limit imposition signal from the engine controller 130 has been inputted.

In case it is determined that a limit imposition signal has not been inputted, the maximum speed setting section 122 selects the table Tnw1 (see FIG. 10A) for use under a no-limit-imposed condition as a calculation table. In case it is determined that a limit imposition signal has been inputted, the maximum speed setting section 122 selects the table Tnw2 (see FIG. 10A) for use under a limit-imposed condition as a calculation table.

Figure 13:
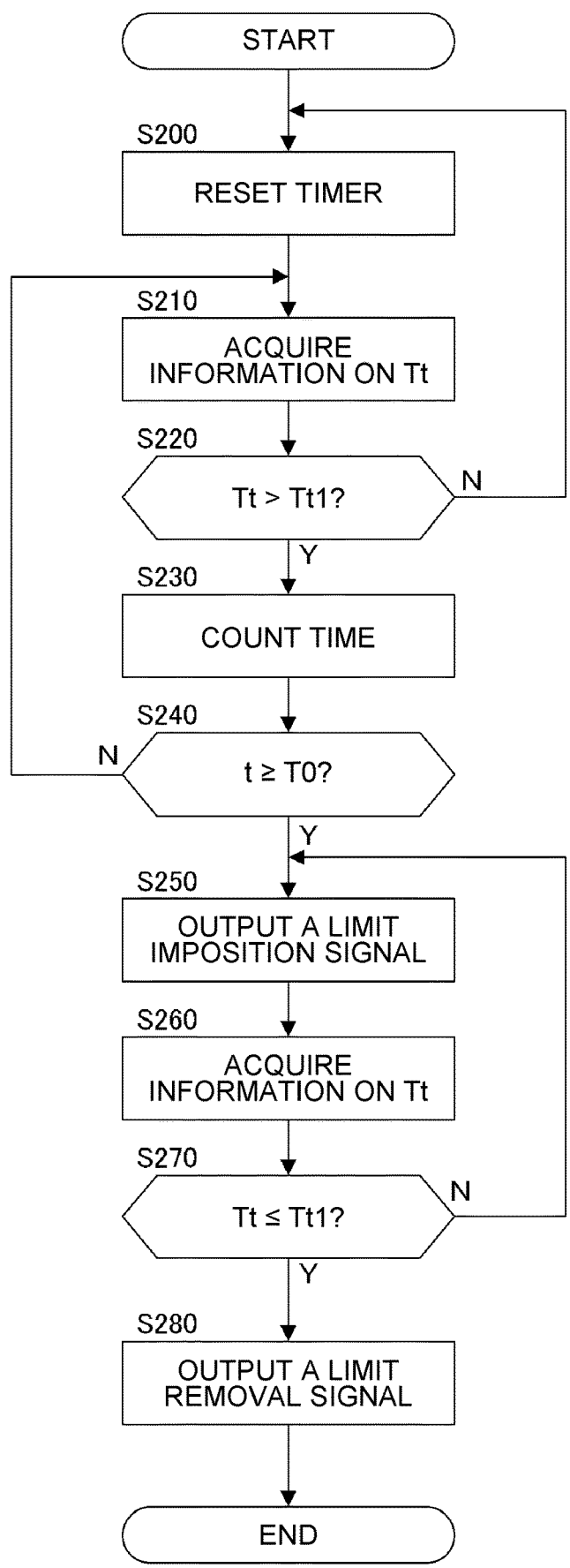
FIG. 13 is a flowchart showing an operation of a limit imposition determination control process performed by an engine controller of a wheel loader according to variation 2 of the second embodiment.

FIG. 13 is a flowchart showing an operation of a limit imposition determination control process performed by the engine controller 130 of the wheel loader 100 according to variation 2 of the second embodiment. In case an ignition switch (not illustrated) is turned on, non-illustrated initialization is performed, and then a program configured to perform the process shown in FIG. 13 is started and executed repeatedly by the engine controller 130 on a predetermined control cycle. Note that the initialization is performed in the no-limit mode in which a limit removal signal is outputted (or a limit imposition signal is not outputted).

In Step S200, which is a timer reset process, the engine controller 130 sets the measured time t on the built-in timer (not illustrated) to 0 (timer reset process), and then goes to step S210.

In Step S210, the engine controller 130 reads information on the substrate temperature Tt of the control board of the turbo controller 140 detected by the substrate temperature sensor 161, stores the information in a storage device, and goes to step S220.

In Step S220, the engine controller 130 determines whether the substrate temperature Tt is higher than the first threshold Tt1. If an affirmative determination is made in step S220, the engine controller 130 goes to step S230, and if a negative determination is made in step S220, the engine controller 130 returns to step S200.

In step S230, which is a time counting process, the engine controller 130 counts time using the built-in timer (not illustrated) (measured time t<-t+Δt), and goes to step S240.

In step S240, the engine controller 130 determines whether the measured time t is equal to or longer than the time threshold t0. If an affirmative determination is made in step S240, the engine controller 130 determines that the limit imposition condition has been met, and goes to step S250. If a negative determination is made in step S240, the engine controller 130 determines that the limit imposition condition has not been met, and returns to step S210.

In step S250, the engine controller 130 sets a limit mode, outputs a limit imposition signal to the main controller 120, giving instructions to impose a limit on the maximum rotational speed Nx of the engine 190, and goes to step S260.

In step S260, the engine controller 130 reads information on the substrate temperature Tt of the control board of the turbo controller 140 detected by the substrate temperature sensor 161, stores the information in the storage device, and goes to step S270.

In step S270, the engine controller 130 determines whether the substrate temperature Tt is equal to or lower than the first threshold Tt1. If a negative determination is made in step S270, the engine controller 130 determines that the limit removal condition is not met, and returns to step S250. If an affirmative determination is made in step S270, the engine controller 130 determines that the limit removal condition has been met, and goes to step S280.

In step S280, the engine controller 130 sets the no-limit mode, outputs a limit removal signal to the main controller 120 to remove the limit on the maximum rotational speed Nx of the engine 190, and thereby finishes the process shown in the flowchart of FIG. 13.

Figure 14:
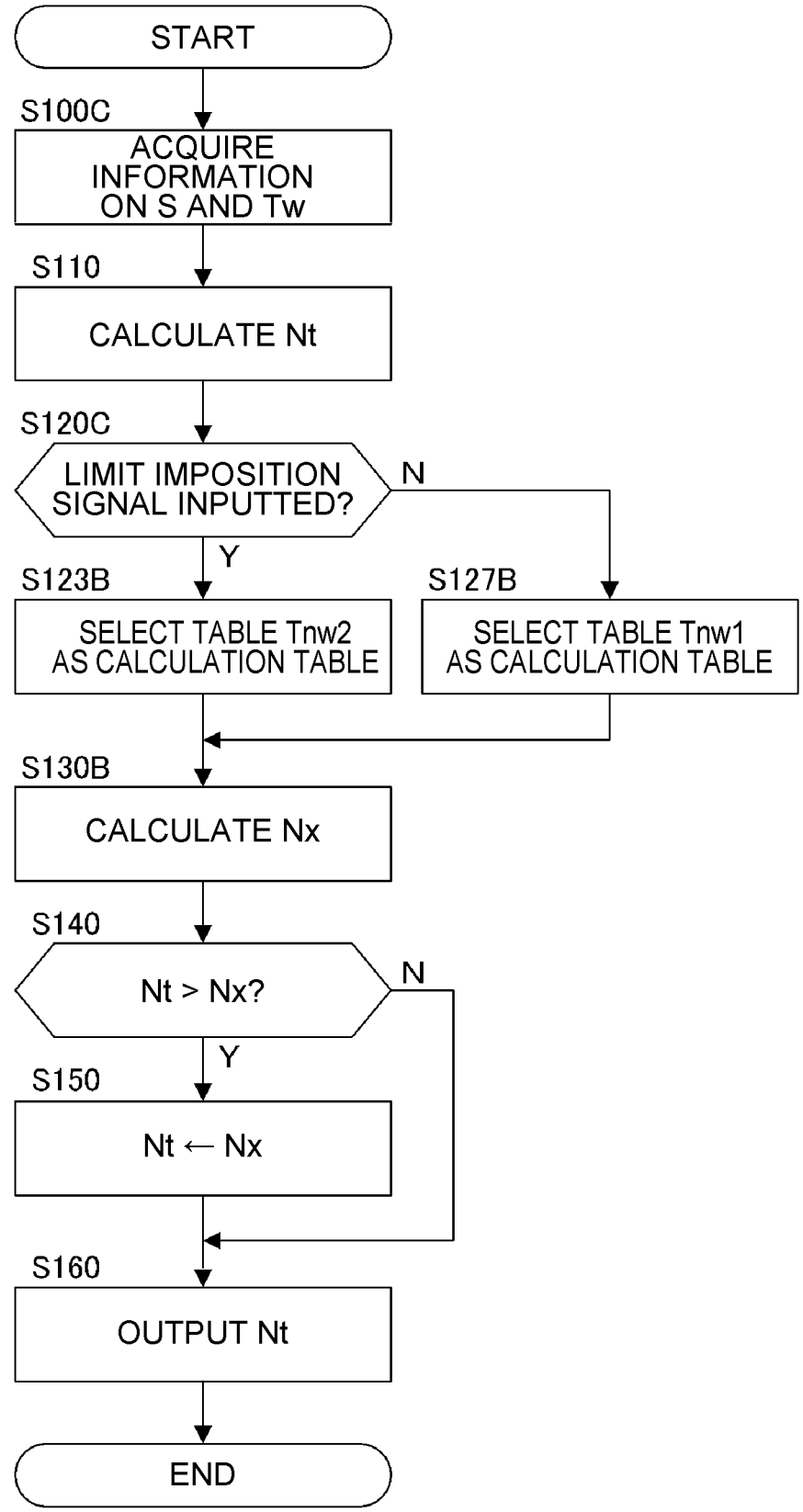
FIG. 14 is a flowchart showing an operation of a limiting control process on maximum rotational speed of an engine performed by a main controller of the wheel loader according to variation 2 of the second embodiment.

FIG. 14 is a flowchart showing an operation of a limiting control process on the maximum rotational speed Nx of the engine 190 performed by the main controller 120 of the wheel loader 100 according to variation 2 of the second embodiment of the present invention. The flowchart of FIG. 14 includes the processes of steps S100C and S120C instead of the steps S100B and S120B of the flowchart of FIG. 11.

As shown in FIG. 14, in step S100C, the main controller 120 reads information on the pedal operation amount S of the accelerator pedal 21 detected by the accelerator operation amount detector 21a and information on the cooling water temperature Tw detected by the cooling water temperature sensor 162, stores the information in the storage device, and then goes to step S110.

In case the target engine rotational speed calculation process in step S110 is finished, the main controller 120 goes to step S120C, in which the main controller 120 determines whether a limit imposition signal has been inputted. If an affirmative determination is made in step S120C, i.e., if the limit mode has been set by the engine controller 130 and a limit imposition signal has been outputted to the main controller 120 from the engine controller 130, the main controller 120 goes to step S123B. On the other hand, if a negative determination is made in step S120B, i.e., if the no-limit mode has been set by the engine controller 130 and a limit imposition signal has not been outputted to the main controller 120 from the engine controller 130 or if a limit removal signal has been outputted, the main controller 120 goes to step S127B.

According to the present variation configured as described above, as with the second embodiment, even if the substrate temperature Tt of the control board of the turbo controller 140 is not detected by the main controller 120 in real time, the temperature of the turbo controller 140 can be reduced effectively.

Third Embodiment

A third embodiment of the present invention will be described with reference to FIGS. 15 and 16A to 16C. Note that the same or equivalent components as/to those of the first embodiment are denoted by the same reference numerals as the corresponding components of the first embodiment, and differences from the first embodiment will mainly be described. The third embodiment differs from the first embodiment in a configuration of the running gear (running system). The wheel loader 100 according to the first embodiment includes torque converter-driven running gear adapted to transmit a driving force of the engine 190 to the tires 103 via the torque converter 2 (see FIG. 2). In contrast, a wheel loader 100 according to the third embodiment includes HST-(Hydro Static Transmission) driven running gear in which a hydraulic pump and hydraulic motor are connected forming a closed circuit.

Figure 15:
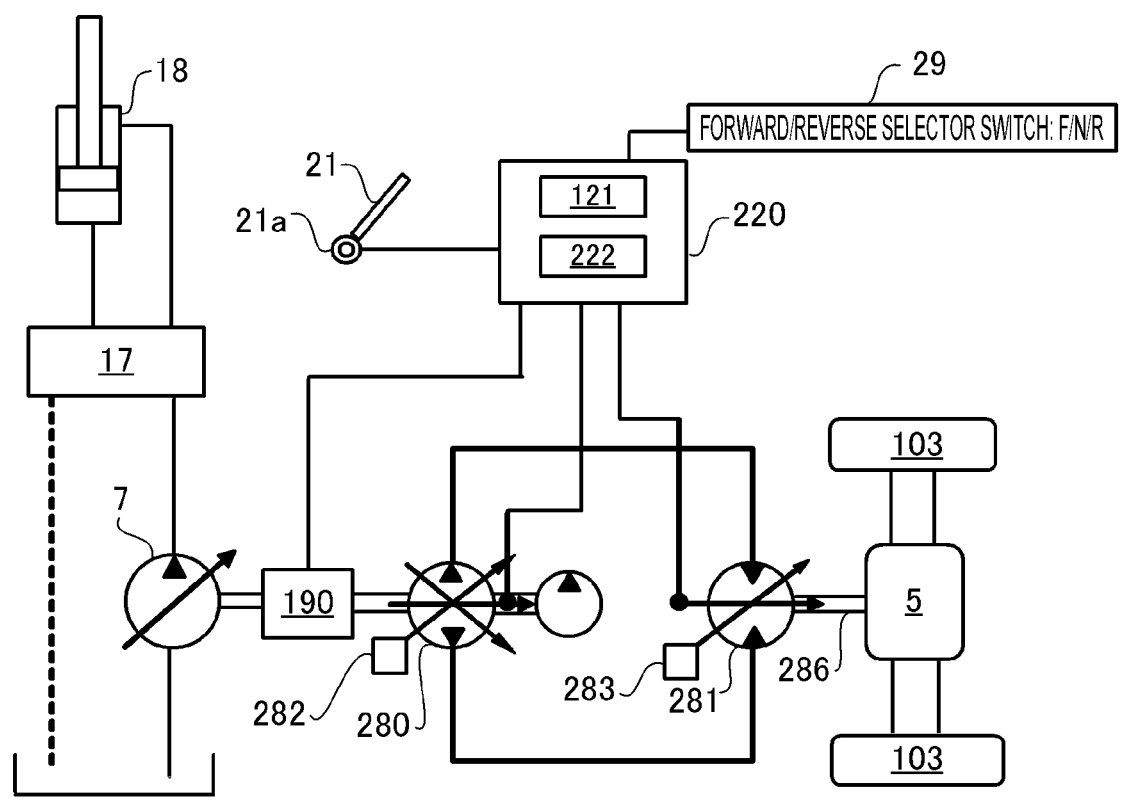
FIG. 15 is a diagram showing a schematic configuration of a wheel loader according to a third embodiment.

FIG. 15 is a diagram showing a schematic configuration of the wheel loader 100 according to the third embodiment. As shown in FIG. 15, the wheel loader 100 includes a traveling hydraulic pump (hereinafter referred to as an HST pump 280) driven by the engine 190 and a hydraulic motor (hereinafter referred to as an HST motor 281) connected to the HST pump 280, forming a closed circuit. In case the HST motor 281 is rotationally driven by the pressure oil discharged from the HST pump 280, output torque of the HST motor 281 is transmitted to an output shaft 286 via a non-illustrated gearbox. Consequently, the tires 103 rotate via the axle 5, causing the vehicle to run.

The HST pump 280 is a variable displacement hydraulic pump of a swash plate type or bent axis type, whose displacement volume qp varies with a tilt angle. The displacement volume qp is controlled by a pump regulator 282. Although not illustrated, the pump regulator 282 includes a tilt cylinder and a forward/reverse selector valve operated by a forward/reverse selector switch 29. Control pressure is supplied to the tilt cylinder via the forward/reverse selector valve, the displacement volume qp is controlled according to the control pressure, and an operating direction of the tilt cylinder and a tilting direction of the HST pump 280 are controlled according to switching of the forward/reverse selector valve.

The control pressure increases in proportion to increases in the engine rotational speed and the displacement volume qp of the HST pump 280 increases with increases in the control pressure. Consequently, since both the rotational speed and displacement volume qp of the HST pump 280 increase with increases in the engine rotational speed (see FIG. 16A), a discharge flow rate of the HST pump 280 increases smoothly in quick response to increases in the engine rotational speed, enabling smooth strong acceleration.

The HST motor 281 is a variable displacement hydraulic motor of a swash plate type or a bent axis type, whose displacement volume qm changes with a tilt angle. A tilt control signal is outputted to a motor regulator 283 from a main controller 220 to control the displacement volume (motor capacity) qm of the HST motor 281. The motor regulator 283 is a tilt control device which includes a solenoid selector valve and a proportional solenoid valve.

Figure 16A:
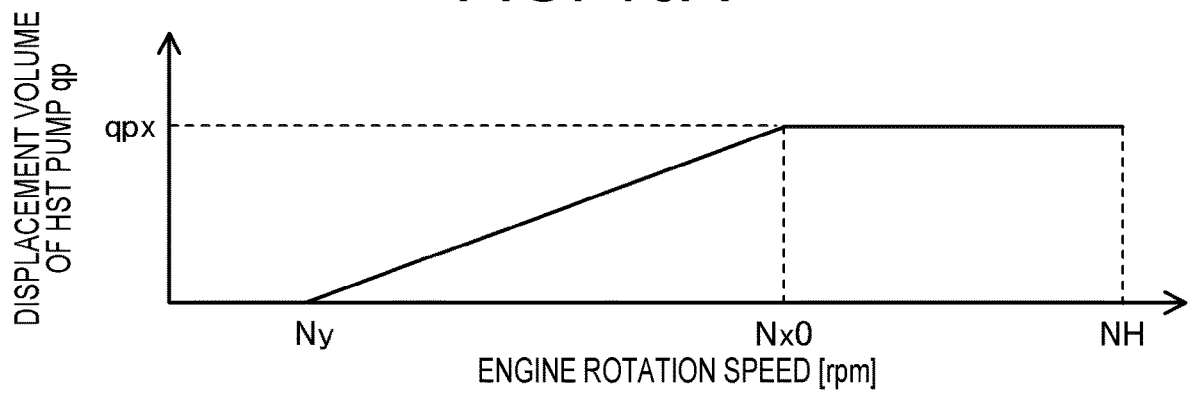
FIG. 16A is a first diagram showing displacement volume of an HST pump versus engine rotational speed.
Figure 16B:
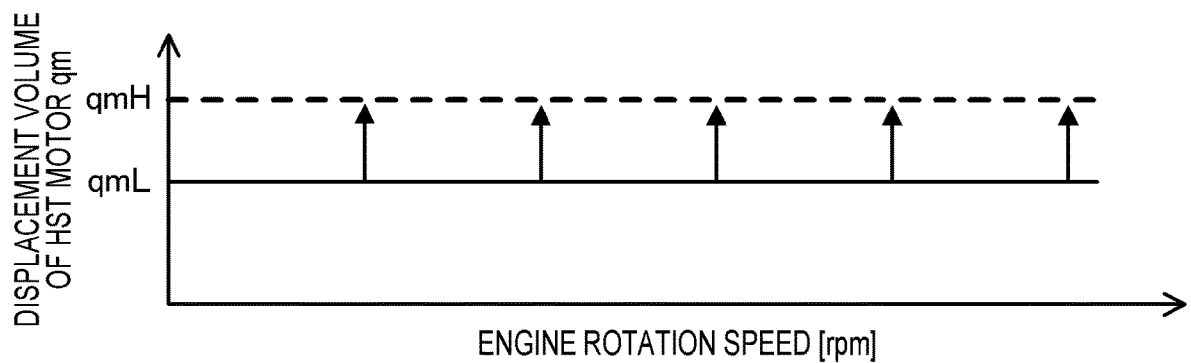
FIG. 16B is a second diagram showing displacement volume of an HST pump versus engine rotational speed as well as showing vehicle speed characteristics.
Figure 16C:
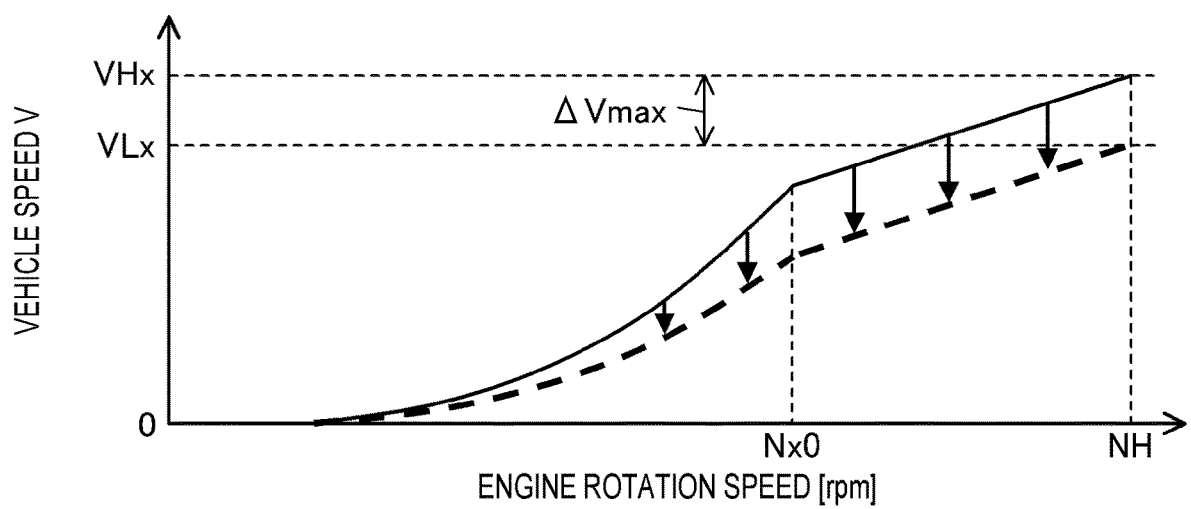
FIG. 16C is a diagram showing vehicle speed characteristics versus engine rotational speed.

FIGS. 16A, 16B, and 16C are diagrams showing the displacement volume qp of the HST pump 280, displacement volume qm of the HST motor 281, and characteristics of the vehicle speed V, respectively, versus the engine rotational speed. In FIGS. 16A to 16C, Ny denotes the engine rotational speed to be developed in order for the HST pump 280 to start discharge, and hereinafter this engine rotational speed will be referred to as discharge start-time engine speed Ny. The discharge start-time engine speed Ny is set to a value equal to or higher than the low idling rotational speed NL (Ny NL). In FIGS. 16B and 16C, the solid lines represent examples of characteristics (characteristics under the no-limit-imposed condition) exhibited in case the displacement volume qm of the HST motor 281 is set to a lower limit qmL and the thick broken lines represent examples of characteristics (characteristics under the limit-imposed condition) exhibited in case the displacement volume qm of the HST motor 281 is set to an upper limit qmH.

As shown in FIG. 16A, the displacement volume qp of the HST pump 280 increases with increases in the engine rotational speed. As shown in FIG. 16B, the displacement volume qm of the HST motor 281 is constant regardless of the engine rotational speed. The main controller 220 functionally includes a motor tilt control section (maximum speed setting section) 222 (see FIG. 15). The motor tilt control section 222 determines whether the substrate temperature Tt of the turbo controller 140 is equal to or higher than the first threshold Tt1.

In case the substrate temperature Tt is higher than the first threshold Tt1, the motor tilt control section 222 outputs a tilt control signal to the motor regulator 283 such that the displacement volume qm of the HST motor 281 will equal the upper limit qmH. In case the substrate temperature Tt is equal to or lower than the first threshold Tt1, the motor tilt control section 222 outputs a tilt control signal to the motor regulator 283 such that the displacement volume qm of the HST motor 281 will equal the lower limit qmL (<qmH).

FIG. 16C is a diagram showing characteristics of the vehicle speed V versus engine rotational speed. Under the no-limit-imposed condition, in case the engine rotational speed is lower than the discharge start-time engine speed Ny, the vehicle speed is 0. In case the engine rotational speed is equal to or higher than the discharge start-time engine speed Ny, but lower than Nx0, since both the rotational speed and displacement volume qp of the HST pump 280 increase (see FIG. 16A), the vehicle speed V increases smoothly in a curvilinear manner in quick response to increases in the engine rotational speed, enabling smooth strong acceleration. In case the engine rotational speed is equal to or higher than Nx0, since the displacement volume qp equals a maximum volume qpx (see FIG. 16A), the vehicle speed V increases linearly with increases in the engine rotational speed.

In the present embodiment, as shown in FIG. 16B, in case a tilt control signal is outputted to the motor regulator 283 from the main controller 220 to set the displacement volume qm of the HST motor 281 to the upper limit qmH, the vehicle speed V is limited to a low speed side as shown in FIG. 16C. That is, in FIG. 16C, the characteristics under the limit-imposed condition (broken lines) are shifted below the characteristics under the no-limit-imposed condition (solid lines). Consequently, the maximum vehicle speed decreases by ΔVmax. Note that ΔVmax is a difference (ΔVmax=VHx−VLx) between maximum vehicle speed VHx developed in case the displacement volume qm of the HST motor 281 is set to qmL and maximum vehicle speed VLx developed in case the displacement volume qm of the HST motor 281 is set to qmH.

The third embodiment includes an HST circuit, which in turn includes the variable displacement HST pump 280 driven by the engine 190 and the variable displacement HST motor 281 connected with the HST pump 280 in a closed circuit and driven by the pressure oil discharged from the HST pump 280. By increasing the displacement volume qm of the HST motor 281, the main controller 220 limits the maximum vehicle speed of the wheel loader 100 to a low level.

Consequently, the third embodiment achieves the following operation and effect in addition to an operation and effect similar to (1) described in the first embodiment.

(10) In case the substrate temperature Tt of the turbo controller 140 is higher than the first threshold Tt1, the main controller 220 limits the maximum vehicle speed of the wheel loader 100 to a lower level than case the substrate temperature Tt is below the first threshold Tt1, but does not limit the maximum rotational speed of the engine 190. This makes it possible to improve working efficiency because the operating speed of the front working device 102 is not limited.

—Variation 1 of Third Embodiment—

Whereas in the example described in the third embodiment, the main controller 220 limits the maximum vehicle speed of the wheel loader 100 to a low level by increasing the displacement volume qm of the HST motor 281, the present invention is not limited to this. The maximum vehicle speed of the wheel loader 100 may be limited to a low level by reducing the displacement volume qp of the HST pump 280. That is, in case the substrate temperature Tt of the turbo controller 140 is higher than the first threshold Tt1, the main controller 220 can limit the maximum vehicle speed of the wheel loader 100 to a low level by changing the displacement volume of the HST pump 280 or HST motor 281.

—Variation 2 of Third Embodiment—

Whereas in the example described in the third embodiment, in case the substrate temperature Tt of the turbo controller 140 is higher than the first threshold Tt1, compared to case the substrate temperature Tt is below the first threshold Tt1, the maximum vehicle speed of the wheel loader 100 is limited to a lower level without limiting the maximum rotational speed of the engine 190, the present invention is not limited to this. The maximum rotational speed of the engine 190 may be limited in a manner similar to the first embodiment. Alternatively, the maximum rotational speed of the engine 190 may be limited without limiting the maximum vehicle speed of the wheel loader 100. In case the maximum rotational speed of the engine 190 is set to a low level, the latter can be implemented by increasing the displacement volume qp of the HST pump 280 such that the maximum vehicle speed will not fall or by reducing the displacement volume qm of the HST motor 281.

—Variation 3 of Third Embodiment—

The present invention is also applicable to a wheel loader 100 equipped with a hybrid HMT (Hydro-Mechanical Transmission) adapted to run by transmitting a driving force of an engine 190 to an HST and mechanical transmission in parallel.

The following variations are also included in the scope of the present invention, and one or more of the variations may be combined with any of the above embodiments.

(Variation 1)

Whereas in the examples described in the above embodiments, the main controller 120 limits at least one of the maximum rotational speed Nx of the engine 190 and maximum vehicle speed of the wheel loader 100, and then removes the limit in case the substrate temperature Tt of the control board of the turbo controller 140 falls below the first threshold Tt1, the present invention is not limited to this. The limit may be removed in case the cooling water temperature for the engine 190 falls to or below a predetermined temperature equal to or lower than the first temperature Tw1.

(Variation 2)

Whereas in the examples described in the above embodiments, the nozzle vane mechanism 59 with a variable opening area is installed on an exhaust side as a supercharger 50 adapted to control boost pressure, the present invention is not limited to this. In order to allow the boost pressure to be changed, an opening area adjustment mechanism with a variable opening area may be installed on an intake side and a flow rate of intake air may be adjusted by controlling the opening area adjustment mechanism using the turbo controller 140. An opening area adjustment mechanism with a variable opening area may be installed both on the exhaust side and intake side. Note that the opening area adjustment mechanism is not limited to the nozzle vane mechanism 59. For example, the flow rate may be controlled by opening and closing a flow control valve.

(Variation 3)

Whereas in the examples described in the above embodiments, the substrate temperature Tt detected by the substrate temperature sensor 161 mounted on the control board is adopted as the temperature of the turbo controller 140 used to limit at least one of the maximum rotational speed of the engine 190 and maximum vehicle speed of the vehicle, the present invention is not limited to this. For example, temperature of a casing adapted to house the control board of the turbo controller 140 may be adopted as the temperature of the turbo controller 140.

(Variation 4)

Whereas in the examples described in the above embodiments, the turbo controller 140 is cooled by the cooling water of the engine 190, the present invention is not limited to this. A cooling fan (not illustrated) adapted to cool the turbo controller 140 may be provided.

(Variation 5)

Whereas in the examples described in the first and second embodiments, the maximum rotational speed Nx of the engine is set by referring to the table Tx, Tnw1, or Tnw2, the present invention is not limited to this. Similar characteristic may be stored in a functional form instead of the tables.

(Variation 6)

Whereas examples of applying the present invention to a wheel loader has been described in the above embodiments, the present invention can similarly be applied to other work vehicles such as wheel shovels and forklifts.

Whereas various embodiments and variations have been described above, the present invention is not limited to the contents thereof. Other embodiments conceivable within the scope of the technical idea of the present invention is also included in the scope of the present invention.

REFERENCE SIGNS LIST

3 transmission, 7 working pump (working hydraulic pump), 8 fan pump (hydraulic pump for fan), 11 fan motor (hydraulic motor for fan), 13 cooling fan, 14 radiator (heat exchanger), 20 transmission control device (gearshift control device), 24 vehicle speed sensor (vehicle speed detection device), 50 supercharger, 100 wheel loader (work vehicle), 102 front working device (working device), 120 main controller (main control device, gearshift control device), 140 turbo controller (supercharger control device), 161 substrate temperature sensor (temperature detection device), 162 cooling water temperature sensor (refrigerant temperature detection device), 190 engine, 220 main controller (main control device), 280 HST pump (traveling hydraulic pump), 281 HST motor (traveling hydraulic motor)

The invention claimed is:

1. A wheel loader comprising a variable geometry supercharger with variable boost pressure, and a front working device driven by a pressure oil discharged from a working hydraulic pump, the wheel loader further comprising:
    a turbo controller adapted to control the supercharger;
    a temperature detection device adapted to detect a temperature of the turbo controller;
    a main controller adapted to perform limiting of at least one of a maximum rotational speed of an engine and a maximum vehicle speed of the wheel loader in a case where the temperature of the turbo controller increases above a predetermined temperature;
    a heat exchanger adapted to cool a refrigerant for the engine;
    a cooling fan adapted to provide cooling air for the heat exchanger, a rotational speed of the cooling fan increasing with an increasing rotational speed of the engine until a maximum rotational speed of the cooling fan reached;
    a hydraulic pump for the cooling fan, the hydraulic pump for the cooling fan being driven by the engine;
    a hydraulic motor for the cooling fan, the hydraulic motor for the cooling fan being driven by the pressure oil discharged from the hydraulic pump for the cooling fan and being adapted to rotate the cooling fan;
    a relief valve for which a set pressure is established such that the maximum rotational speed of the cooling fan is reached once the rotational speed of the engine reaches a first rotational speed,
    wherein the maximum rotational speed of the cooling fan is maintained if the maximum rotational speed of the engine is increased from the first rotational speed toward a second rotational speed greater than the first rotational speed and if the maximum rotational speed of the engine is decreased from the second rotational speed toward the first rotational speed, and
    wherein, in the case where the temperature of the turbo controller is above the predetermined temperature, the main controller performs limiting of the maximum rotational speed of the engine to be between the first rotational speed and the second rotational speed.

2. The wheel loader according to claim 1, further comprising:
    a refrigerant temperature detection device adapted to detect a temperature of refrigerant for the engine,
    wherein in the case where the temperature of the turbo controller is above the predetermined temperature, the main controller performs limiting of at least one of the maximum rotational speed of the engine and the maximum vehicle speed of the wheel loader based on the temperature of the refrigerant.

3. The wheel loader according to claim 1, further comprising:
    a vehicle speed detection device adapted to detect a vehicle speed of the wheel loader; and
    a gearshift control device adapted to shift up a speed stage of a transmission, in a case where the vehicle speed detected by the vehicle speed detection device becomes higher than an upshift-permitting vehicle speed,
    wherein in the case where the temperature of the turbo controller is above the predetermined temperature, the main controller performs limiting of the maximum vehicle speed of the wheel loader between a lower limit and an upper limit, with the upshift-permitting vehicle speed being set lower than the lower limit of the maximum vehicle speed of the wheel loader.

4. The wheel loader according to claim 1, further comprising:
    an HST circuit, the HST circuit including a variable displacement traveling hydraulic pump driven by the engine, and a variable displacement traveling hydraulic motor connected with the traveling hydraulic pump in a closed circuit and driven by a pressure oil discharged from the traveling hydraulic pump,
    wherein, in the case where the temperature of the turbo controller is above the predetermined temperature, the main controller performs limiting of the maximum vehicle speed of the wheel loader by changing a displacement volume of the traveling hydraulic pump or traveling hydraulic motor.

5. The wheel loader according to claim 1, wherein in the case where the temperature of the turbo controller is above the predetermined temperature, the main controller performs limiting of at least one of the maximum rotational speed of the engine and the maximum vehicle speed of the wheel loader, and subsequently, in a case where the temperature of the turbo controller falls below a threshold equal to or lower than the predetermined temperature, the main controller stops performing the limiting.

6. The wheel loader according to claim 1, wherein in the case where the temperature of the turbo supercharger control device is above the predetermined temperature, the main controller performs limiting of at least one of the maximum rotational speed of the engine and the maximum vehicle speed of the wheel loader, and, subsequently, in a case where temperature of refrigerant for the engine falls below a predetermined refrigerant temperature, the main controller stops performing the limiting.

\* \* \* \* \*